US007853022B2

(12) United States Patent
Thompson et al.

(10) Patent No.: US 7,853,022 B2
(45) Date of Patent: Dec. 14, 2010

(54) AUDIO SPATIAL ENVIRONMENT ENGINE

(76) Inventors: Jeffrey K. Thompson, 19511 92nd Ave. NE., Bothell, WA (US) 98011; Robert W. Reams, 14415 21st Dr. SE., Mill Creek, WA (US) 98012; Aaron Warner, 316 E. Harrison St. #102, Seattle, WA (US) 98102

( * ) Notice: Subject to any disclaimer, the term of this patent is extended or adjusted under 35 U.S.C. 154(b) by 1403 days.

(21) Appl. No.: 11/262,029

(22) Filed: Oct. 28, 2005

(65) Prior Publication Data

US 2006/0093152 A1 May 4, 2006

Related U.S. Application Data

(60) Provisional application No. 60/622,922, filed on Oct. 28, 2004.

(51) Int. Cl.
*H04R 5/00* (2006.01)
*H04B 1/00* (2006.01)

(52) U.S. Cl. ............................ 381/17; 381/18; 381/19; 381/23; 381/119

(58) Field of Classification Search .................... 381/1, 381/2, 17–20, 21, 22, 23, 56, 58, 119; 704/500
See application file for complete search history.

(56) References Cited

U.S. PATENT DOCUMENTS

| | | |
|---|---|---|
| 3,732,370 A | 5/1973 | Sacks |
| 4,458,362 A | 7/1984 | Berkovitz et al. |
| 4,748,669 A | 5/1988 | Klayman |
| 4,866,774 A | 9/1989 | Klayman |

(Continued)

FOREIGN PATENT DOCUMENTS

EP 0571635 A 12/1993

(Continued)

OTHER PUBLICATIONS

Mouri et al.—"Surround Sound Reproducing System with Two Front Speakers" Consumer Electronics, 1997, Digest of Technical Papers, Jun. 11, 1997, pp. 300-301.

(Continued)

*Primary Examiner*—Vivian Chin
*Assistant Examiner*—George Monikang
(74) *Attorney, Agent, or Firm*—Gaurav K. Mokindra; William L. Johnson; Blake A. Welcher

(57) ABSTRACT

An audio spatial environment engine for flexible and scalable up-mixing from an M channel audio system to an N channel audio system, where M and N are integers and N is greater than M, is provided. The input M channel audio is provided to an analysis filter bank which converts the time domain signals into frequency domain signals. Relevant inter-channel spatial cues are extracted from the frequency domain signals on a sub-band basis and are used as parameters to generate adaptive N channel filters which control the spatial placement of a frequency band element in the up-mixed sound field. The N channel filters are smoothed across both time and frequency to limit filter variability which could cause annoying fluctuation effects. The smoothed N channel filters are then applied to adaptive combinations of the frequency domain input signals and are provided to a synthesis filter bank which generates the N channel time domain output signals.

21 Claims, 11 Drawing Sheets

U.S. PATENT DOCUMENTS

| | | | | |
|---|---|---|---|---|
| 5,481,615 | A | 1/1996 | Eatwell et al. | |
| 5,796,844 | A | 8/1998 | Griesinger | |
| 5,899,970 | A | 5/1999 | Sonohara | |
| D435,842 | S | 1/2001 | Klayman | |
| 6,173,061 | B1 | 1/2001 | Norris et al. | |
| 7,003,467 | B1 | 2/2006 | Smith et al. | |
| 7,668,722 | B2 | 2/2010 | Villemoes et al. | |
| 2002/0071574 | A1 | 6/2002 | Aylward et al. | |
| 2002/0120458 | A1 | 8/2002 | Silfvast et al. | |
| 2004/0105550 | A1 | 6/2004 | Aylward et al. | |
| 2005/0157883 | A1 * | 7/2005 | Herre et al. | 381/17 |
| 2006/0104106 | A1 | 5/2006 | Aratani et al. | |

FOREIGN PATENT DOCUMENTS

| | | |
|---|---|---|
| JP | 2006165237 | 6/2010 |
| WO | WO2006048203 | 5/2006 |

OTHER PUBLICATIONS

Avendano et al.—"Ambience Extraction and Synthesis from Stereo Signals for Multi-Channel Audio Up-Mix", 2002 IEEE International conference on Acoustics, Speech, and Signal Processing Proceedings, May 13, 2002, pp. II-1957-II-1960.

PCT International Search Report—PCT/US2005/038961.

PCT Written Opinion—PCT/US01/28088—"System and Method of Processing Data".

PCT International Search Report and Written Opinion—PCT/US2007/004711—"Codec Conditioning System and Method".

Chang et al.—"A Masking Threshold-Adapted Weighing Filer for Excitation Search", IEEE Transactions on Speech and Audio Processing, IEEE Service Center, New York, vol. 4, No. 2, Mar. 2, 1996 (9 pages).

J. Heere et al.—"The Reference Model Architecture for MPEG Spatial Audio Coding", Audio Engineering Society Convention Paper 6447, Presented at the 188th Convention, May 28-31, 2005, Barcelona, Spain (13 pages).

Brandenburg, "Low Bitrate Audio Coding—State-of-the-Art, Challenges and Future Directions", Communication Technology Proceedings , 2000.WCC—ICCT 2000. International Conference on Beijing, China, Aug. 21-25, 2000. Piscataway, NJ, vol. 1, Aug. 21, 2000 (4 pages).

Xu et al.—"Stream-Based Interactive Video Language Authoring using Correleated Audiovisual Watermarking", Proceedings of the Third International Conference on Information Technology and Applications (ICITA'05), 2005 IEEE (4 pages).

* cited by examiner

600

AUDIO SPATIAL ENVIRONMENT ENGINE

This application claims priority to U.S. Provisional Patent Application No. 60/622,922, filed Oct. 28, 2004, entitled “2-to-N Rendering”; U.S. patent application Ser. No. 10/975,841, filed Oct. 28, 2004, entitled “Audio Spatial Environment Engine”; and is related to U.S. patent application Ser. No. 11/262,190, filed Oct. 28, 2005, entitled “Audio Spatial Environment Engine”; and U.S. patent application Ser. No. 11/261,100, filed Oct. 28, 2005, entitled “Audio Spatial Environment Down-Mixer,” and is related to U.S. application Ser. No. 11/666,512, filed May 4, 2007, entitled “Audio Spatial Environment Engine,” which is a national stage entry of PCT/US05/38961, filed Oct. 28, 2005.

FIELD OF THE INVENTION

The present invention pertains to the field of audio data processing, and more particularly to a system and method for up-mixing from M-channel data to N-channel data, where N and M are integers and N is greater than M.

BACKGROUND OF THE INVENTION

Systems and methods for processing audio data are known in the art. Most of these systems and methods are used to process audio data for a known audio environment, such as a two-channel stereo environment, a four-channel quadraphonic environment, a five channel surround sound environment (also known as a 5.1 channel environment), or other suitable formats or environments.

One problem posed by the increasing number of formats or environments is that audio data that is processed for optimal audio quality in a first environment is often not able to be readily used in a different audio environment. One example of this problem is the conversion of stereo sound data to surround sound data. A listener can perceive a noticeable change in sound quality when programming changes from a stereo format to a surround sound format. For example, as the additional channels of audio data for a 5.1 channel surround sound format are not present in a stereo two-channel format, existing surround systems rely on sub-optimal up-mix methods that commonly produce unsatisfactory results. Traditional up-mix methods steer a small number of dominant broadband signal elements around a fixed-channel sound field based on time domain energy measurements. The resulting surround sound experience is commonly unstable and spatially indistinct.

SUMMARY OF THE INVENTION

In accordance with the present invention, a system and method for an audio spatial environment engine are provided that overcome known problems with converting between spatial audio environments.

In particular, a system and method for an audio spatial environment engine are provided that allows up-mixing from M-channel data to N-channel data, where N and M are integers and N is greater than M.

In accordance with an exemplary embodiment of the present invention, an audio spatial environment engine for converting from an M channel audio format to an N channel audio format, such as in an up-mix system, where N and M are integers and N is greater than M, is provided. In operation, this up-mix methodology adaptively reacts to the variable spatial cues of an input signal to generate an accurate and consistent up-mixed sound field. The up-mix methodology can be viewed as a perceptually founded process that uses the psycho-acoustic spatial cues of inter-channel level difference (ICLD) and inter-channel coherence (ICC) over a plurality of frequency bands to generate an up-mixed sound field with improved distinction and detail. The up-mix methodology has the benefits of providing a spatially distinct, stable, and detailed sound field while having a completely scalable architecture suitable for a wide range of existing and future channel/speaker configurations.

In accordance with an exemplary embodiment of the present invention, the input M channel audio is provided to an analysis filter bank which converts the time domain signals into frequency domain signals. Inter-channel spatial cues are extracted from the frequency domain signals on a sub-band basis and are used as parameters to generate adaptive N channel filters which control the spatial placement of a frequency band element in the up-mixed sound field. The N channel filters are smoothed across both time and frequency to limit filter variability which could cause annoying fluctuation effects. The smoothed N channel filters are then applied to adaptive combinations of the frequency domain input signals and are provided to a synthesis filter bank which generates the N channel time domain output signals.

The present invention provides many important technical advantages. One important technical advantage of the present invention is a methodology which produces a more accurate, distinct, and stable surround sound field through the processing of inter-channel spatial cues over a plurality of frequency bands. The present invention introduces a completely flexible and scalable architecture which can be adjusted for appropriate processing over a wide range of existing and future channel/speaker configurations.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

Figure 1:
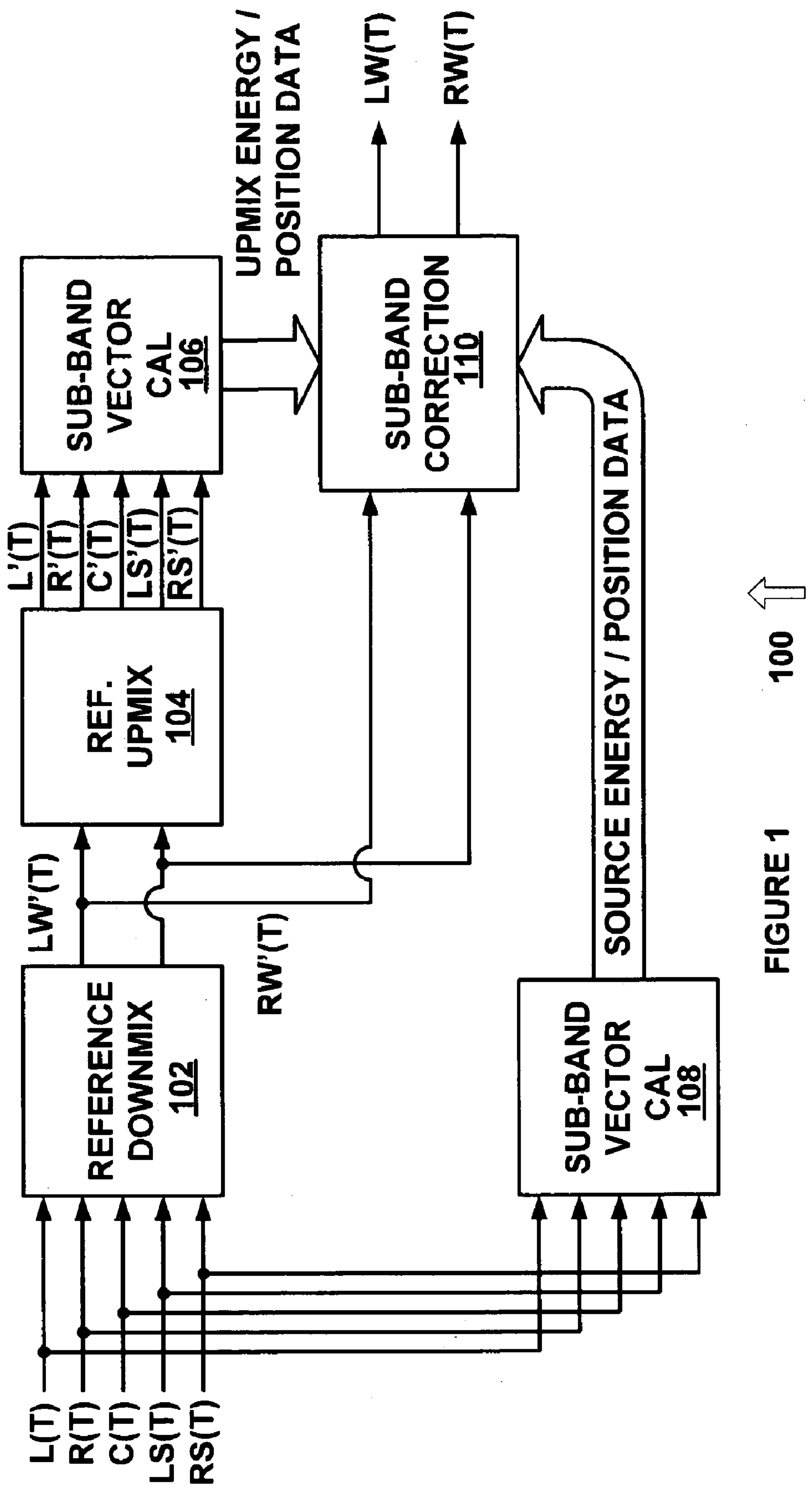
FIG. 1 is a diagram of a system for dynamic down-mixing with an analysis and correction loop in accordance with an exemplary embodiment of the present invention.

In the description that follows, like parts are marked throughout the specification and drawings with the same reference numerals. The drawing figures might not be to scale and certain components can be shown in generalized or schematic form and identified by commercial designations in the interest of clarity and conciseness.

FIG. 1 is a diagram of a system 100 for dynamic down-mixing from an N-channel audio format to an M-channel audio format with an analysis and correction loop in accordance with an exemplary embodiment of the present invention. System 100 uses 5.1 channel sound (i.e. N=5) and converts the 5.1 channel sound to stereo sound (i.e. M=2), but other suitable numbers of input and output channels can also or alternatively be used.

The dynamic down-mix process of system 100 is implemented using reference down-mix 102, reference up-mix 104, sub-band vector calculation systems 106 and 108, and sub-band correction system 110. The analysis and correction loop is realized through reference up-mix 104, which simulates an up-mix process, sub-band vector calculation systems 106 and 108, which compute energy and position vectors per frequency band of the simulated up-mix and original signals, and sub-band correction system 110, which compares the energy and position vectors of the simulated up-mix and original signals and modifies the inter-channel spatial cues of the down-mixed signal to correct for any inconsistencies.

System 100 includes static reference down-mix 102, which converts the received N-channel audio to M-channel audio. Static reference down-mix 102 receives the 5.1 sound channels left L(T), right R(T), center C(T), left surround LS(T), and right surround RS(T) and converts the 5.1 channel signals into stereo channel signals left watermark LW' (T) and right watermark RW'(T).

The left watermark LW'(T) and right watermark RW'(T) stereo channel signals are subsequently provided to reference up-mix 104, which converts the stereo sound channels into 5.1 sound channels. Reference up-mix 104 outputs the 5.1 sound channels left L' (T), right R' (T), center C' (T), left surround LS' (T), and right surround RS'(T).

The up-mixed 5.1 channel sound signals output from reference up-mix 104 are then provided to sub-band vector calculation system 106. The output from sub-band vector calculation system 106 is the up-mixed energy and image position data for a plurality of frequency bands for the up-mixed 5.1 channel signals L' (T), R' (T), C' (T), LS' (T), and RS' (T). Likewise, the original 5.1 channel sound signals are provided to sub-band vector calculation system 108. The output from sub-band vector calculation system 108 is the source energy and image position data for a plurality of frequency bands for the original 5.1 channel signals L(T), R(T), C(T), LS(T), and RS(T). The energy and position vectors computed by sub-band vector calculation systems 106 and 108 consist of a total energy measurement and a 2-dimensional vector per frequency band which indicate the perceived intensity and source location for a given frequency element for a listener under ideal listening conditions. For example, an audio signal can be converted from the time domain to the frequency domain using an appropriate filter bank, such as a finite impulse response (FIR) filter bank, a quadrature mirror filter (QMF) bank, a discrete Fourier transform (DFT), a time-domain aliasing cancellation (TDAC) filter bank, or other suitable filter bank. The filter bank outputs are further processed to determine the total energy per frequency band and a normalized image position vector per frequency band.

The energy and position vector values output from sub-band vector calculation systems 106 and 108 are provided to sub-band correction system 110, which analyzes the source energy and position for the original 5.1 channel sound with the up-mixed energy and position for the 5.1 channel sound as it is generated from the left watermark LW' (T) and right watermark RW' (T) stereo channel signals. Differences between the source and up-mixed energy and position vectors are then identified and corrected per sub-band on the left watermark LW' (T) and right watermark RW' (T) signals producing LW (T) and RW(T) so as to provide a more accurate down-mixed stereo channel signal and more accurate 5.1 representation when the stereo channel signals are subsequently up-mixed. The corrected left watermark LW(T) and right watermark RW(T) signals are output for transmission, reception by a stereo receiver, reception by a receiver having up-mix functionality, or for other suitable uses.

In operation, system 100 dynamically down-mixes 5.1 channel sound to stereo sound through an intelligent analysis and correction loop, which consists of simulation, analysis, and correction of the entire down-mix/up-mix system. This methodology is accomplished by generating a statically down-mixed stereo signal LW' (T) and RW' (T), simulating the subsequent up-mixed signals L' (T), R' (T), C' (T), LS' (T), and RS' (T), and analyzing those signals with the original 5.1 channel signals to identify and correct any energy or position vector differences on a sub-band basis that could affect the quality of the left watermark LW' (T) and right watermark RW' (T) stereo signals or subsequently up-mixed surround channel signals. The sub-band correction processing which produces left watermark LW(T) and right watermark RW(T) stereo signals is performed such that when LW(T) and RW(T) are up-mixed, the 5.1 channel sound that results matches the original input 5.1 channel sound with improved accuracy. Likewise, additional processing can be performed so as to allow any suitable number of input channels to be converted into a suitable number of watermarked output channels, such as 7.1 channel sound to watermarked stereo, 7.1 channel sound to watermarked 5.1 channel sound, custom sound channels (such as for automobile sound systems or theaters) to stereo, or other suitable conversions.

Figure 2:
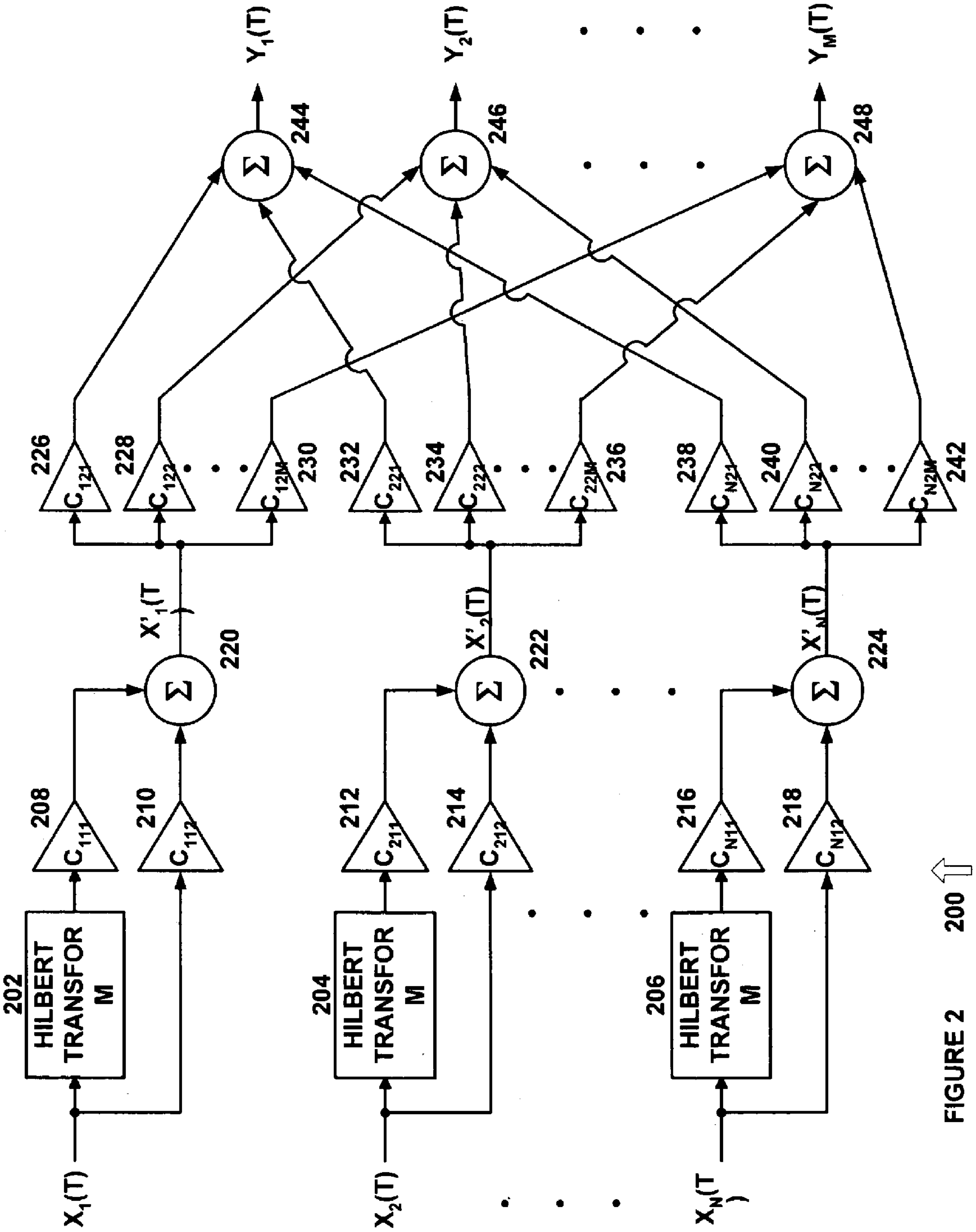
FIG. 2 is a diagram of a system for down-mixing data from N channels to M channels in accordance with an exemplary embodiment of the present invention.

FIG. 2 is a diagram of a static reference down-mix 200 in accordance with an exemplary embodiment of the present invention. Static reference down-mix 200 can be used as reference down-mix 102 of FIG. 1 or in other suitable manners.

Reference down-mix 200 converts N channel audio to M channel audio, where N and M are integers and N is greater than M. Reference down-mix 200 receives input signals $X_1(T)$, $X_2(T)$, through $X_N(T)$. For each input channel i, the input signal $X_i(T)$ is provided to a Hilbert transform unit 202 through 206 which introduces a 90° phase shift of the signal. Other processing such as Hilbert filters or all-pass filter networks that achieve a 90° phase shift could also or alternately be used in place of the Hilbert transform unit. For each input channel i, the Hilbert transformed signal and the original input signal are then multiplied by a first stage of multipliers 208 through 218 with predetermined scaling constants $C_{i11}$ and $C_{i12}$, respectively, where the first subscript represents the input channel number i, the second subscript represents the first stage of multipliers, and the third subscript represents the multiplier number per stage. The outputs of multipliers 208 through 218 are then summed by summers 220 through 224, generating the fractional Hilbert signal $X'_i(T)$. The fractional Hilbert signals $X'_i(T)$ output from multipliers 220 through 224 have a variable amount of phase shift relative to the corresponding input signals $X_i(T)$. The amount of phase shift is dependent on the scaling constants $C_{i11}$ and $C_{i12}$, where 0° phase shift is possible corresponding to $C_{i11}=0$ and $C_{i12}=1$, and ±90° phase shift is possible corresponding to $C_{i11}=\pm1$ and $C_{i12}=0$. Any intermediate amount of phase shift is possible with appropriate values of $C_{i11}$ and $C_{i12}$.

Each signal $X'_i(T)$ for each input channel i is then multiplied by a second stage of multipliers 226 through 242 with predetermined scaling constant $C_{i2j}$, where the first subscript represents the input channel number i, the second subscript represents the second stage of multipliers, and the third subscript represents the output channel number j. The outputs of multipliers 226 through 242 are then appropriately summed by summers 244 through 248 to generate the corresponding output signal $Y_j(T)$ for each output channel j. The scaling constants $C_{i2j}$ for each input channel i and output channel j are determined by the spatial positions of each input channel i and output channel j. For example, scaling constants $C_{i2j}$ for a left input channel i and right output channel j can be set near zero to preserve spatial distinction. Likewise, scaling constants $C_{i2j}$ for a front input channel i and front output channel j can be set near one to preserve spatial placement.

In operation, reference down-mix 200 combines N sound channels into M sound channels in a manner that allows the spatial relationships among the input signals to be arbitrarily managed and extracted when the output signals are received at a receiver. Furthermore, the combination of the N channel sound as shown generates M channel sound that is of acceptable quality to a listener listening in an M channel audio environment. Thus, reference down-mix 200 can be used to convert N channel sound to M channel sound that can be used with an M channel receiver, an N channel receiver with a suitable up-mixer, or other suitable receivers.

Figure 3:
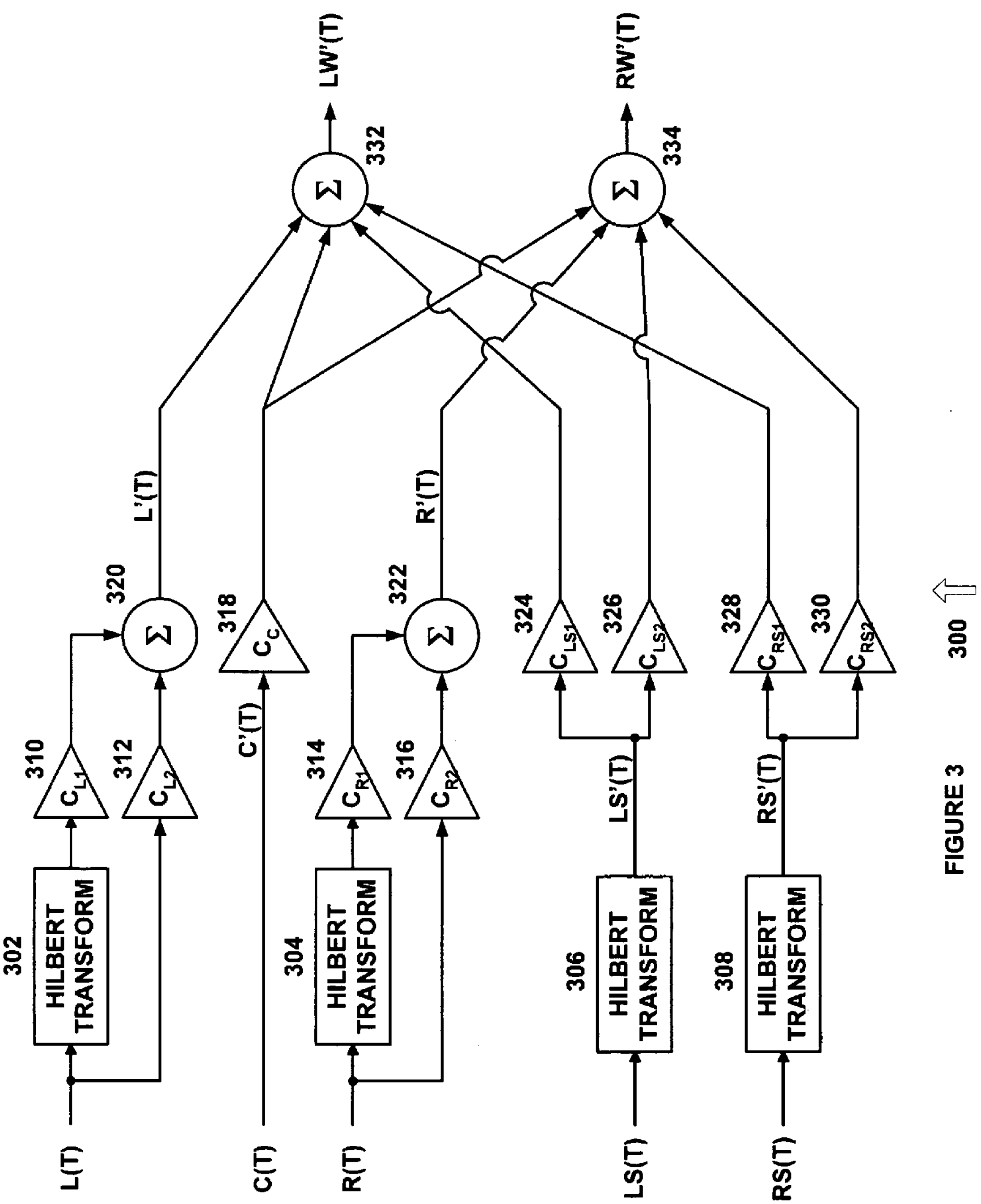
FIG. 3 is a diagram of a system for down-mixing data from 5 channels to 2 channels in accordance with an exemplary embodiment of the present invention.

FIG. 3 is a diagram of a static reference down-mix 300 in accordance with an exemplary embodiment of the present invention. As shown in FIG. 3, static reference down-mix 300 is an implementation of static reference down-mix 200 of FIG. 2 which converts 5.1 channel time domain data into stereo channel time domain data. Static reference down-mix 300 can be used as reference down-mix 102 of FIG. 1 or in other suitable manners.

Reference down-mix 300 includes Hilbert transform 302, which receives the left channel signal L(T) of the source 5.1 channel sound, and performs a Hilbert transform on the time signal. The Hilbert transform introduces a 90° phase shift of the signal, which is then multiplied by multiplier 310 with a predetermined scaling constant $C_{L1}$. Other processing such as Hilbert filters or all-pass filter networks that achieve a 90° phase shift could also or alternately be used in place of the Hilbert transform unit. The original left channel signal L(T) is multiplied by multiplier 312 with a predetermined scaling constant $C_{L2}$. The outputs of multipliers 310 and 312 are summed by summer 320 to generate fractional Hilbert signal L' (T). Likewise, the right channel signal R(T) from the source 5.1 channel sound is processed by Hilbert transform 304 and multiplied by multiplier 314 with a predetermined scaling constant $C_{R1}$. The original right channel signal R(T) is multiplied by multiplier 316 with a predetermined scaling constant $C_{R2}$. The outputs of multipliers 314 and 316 are summed by summer 322 to generate fractional Hilbert signal R' (T). The fractional Hilbert signals L' (T) and R' (T) output from multipliers 320 and 322 have a variable amount of phase shift relative to the corresponding input signals L(T) and R(T), respectively. The amount of phase shift is dependent on the scaling constants $C_{L1}$, $C_{L2}$, $C_{R1}$, and $C_{R2}$, where 0° phase shift is possible corresponding to $C_{L1}=0$ and $C_{L2}=1$ and $C_{R1}=0$ and $C_{R2}=1$, and ±90° phase shift is possible corresponding to $C_{L1}=\pm1$ and $C_{L2}=0$ and $C_{R1}=\pm1$ and $C_{R2}=0$. Any intermediate amount of phase shift is possible with appropriate values of $C_{L1}$, $C_{L2}$, $C_{R1}$, and $C_{R2}$. The center channel input from the source 5.1 channel sound is provided to multiplier 318 as fractional Hilbert signal C' (T), implying that no phase shift is performed on the center channel input signal. Multiplier 318 multiplies C' (T) with a predetermined scaling constant C3, such as an attenuation by three decibels. The outputs of summers 320 and 322 and multiplier 318 are appropriately summed into the left watermark channel LW' (T) and the right watermark channel RW' (T).

The left surround channel LS(T) from the source 5.1 channel sound is provided to Hilbert transform 306, and the right surround channel RS(T) from the source 5.1 channel sound is provided to Hilbert transform 308. The outputs of Hilbert transforms 306 and 308 are fractional Hilbert signals LS' (T) and RS' (T), implying that a full 90° phase shift exists between the LS(T) and LS' (T) signal pair and RS(T) and RS' (T) signal pair. LS' (T) is then multiplied by multipliers 324 and 326 with predetermined scaling constants $C_{LS1}$ and $C_{LS2}$, respectively. Likewise, RS' (T) is multiplied by multipliers 328 and 330 with predetermined scaling constants $C_{RS1}$ and $C_{RS2}$, respectively. The outputs of multipliers 324 through 330 are appropriately provided to left watermark channel LW' (T) and right watermark channel RW' (T).

Summer 332 receives the left channel output from summer 320, the center channel output from multiplier 318, the left surround channel output from multiplier 324, and the right surround channel output from multiplier 328 and adds these signals to form the left watermark channel LW' (T). Likewise, summer 334 receives the center channel output from multiplier 318, the right channel output from summer 322, the left surround channel output from multiplier 326, and the right surround channel output from multiplier 330 and adds these signals to form the right watermark channel RW' (T).

In operation, reference down-mix 300 combines the source 5.1 sound channels in a manner that allows the spatial relationships among the 5.1 input channels to be maintained and extracted when the left watermark channel and right watermark channel stereo signals are received at a receiver. Furthermore, the combination of the 5.1 channel sound as shown generates stereo sound that is of acceptable quality to a listener using stereo receivers that do not perform a surround sound up-mix. Thus, reference down-mix 300 can be used to convert 5.1 channel sound to stereo sound that can be used with a stereo receiver, a 5.1 channel receiver with a suitable up-mixer, a 7.1 channel receiver with a suitable up-mixer, or other suitable receivers.

Figure 4:
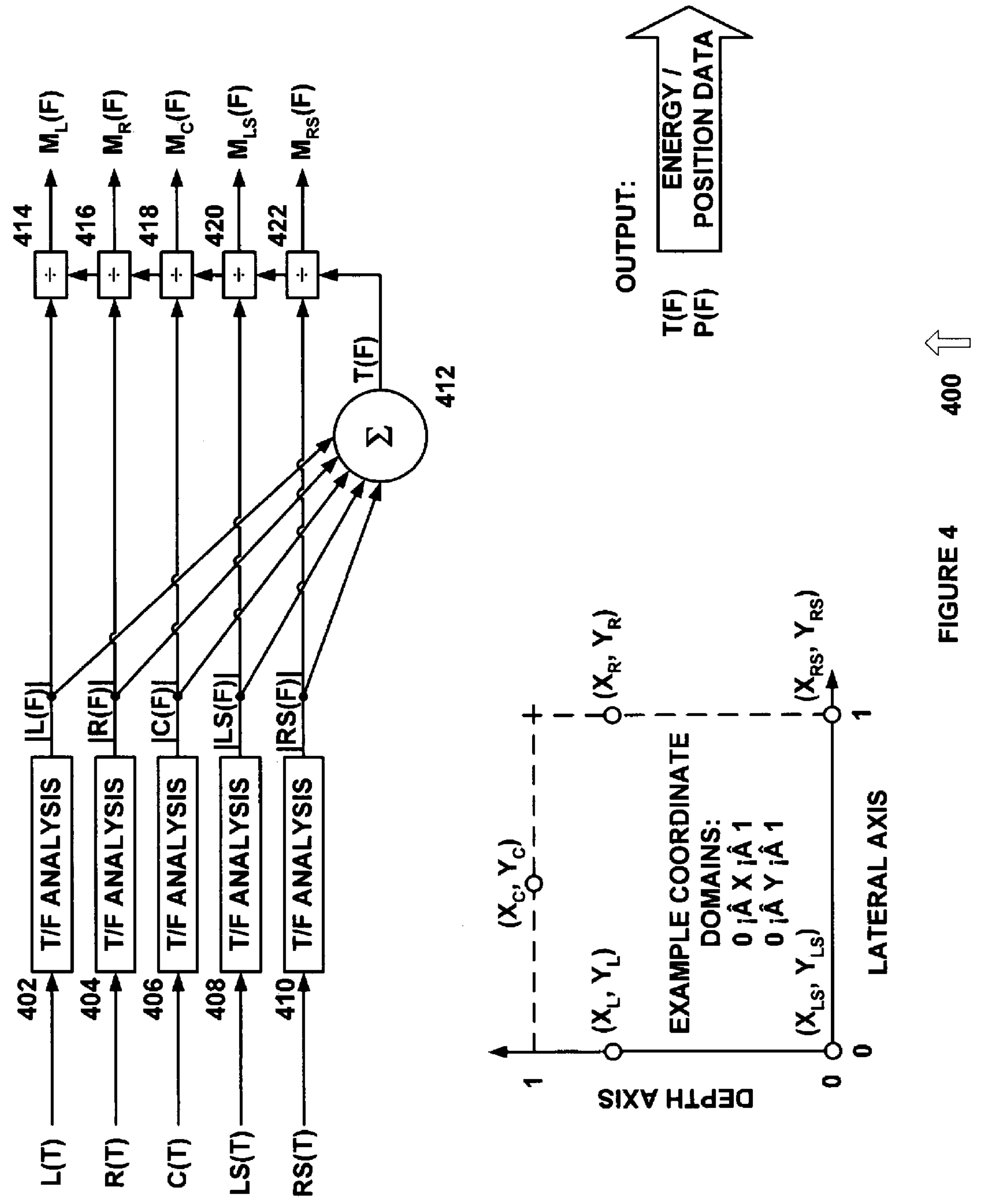
FIG. 4 is a diagram of a sub-band vector calculation system in accordance with an exemplary embodiment of the present invention.

FIG. 4 is a diagram of a sub-band vector calculation system 400 in accordance with an exemplary embodiment of the present invention. Sub-band vector calculation system 400 provides energy and position vector data for a plurality of frequency bands, and can be used as sub-band vector calculation systems 106 and 108 of FIG. 1. Although 5.1 channel sound is shown, other suitable channel configurations can be used.

Sub-band vector calculation system 400 includes time-frequency analysis units 402 through 410. The 5.1 time domain sound channels L(T), R(T), C(T), LS(T), and RS(T) are provided to time-frequency analysis units 402 through 410, respectively, which convert the time domain signals into frequency domain signals. These time-frequency analysis units can be an appropriate filter bank, such as a finite impulse response (FIR) filter bank, a quadrature mirror filter (QMF) bank, a discrete Fourier transform (DFT), a time-domain aliasing cancellation (TDAC) filter bank, or other suitable filter bank. A magnitude or energy value per frequency band is output from time-frequency analysis units 402 through 410 for L(F), R(F), C(F), LS(F), and RS(F). These magnitude/energy values consist of a magnitude/energy measurement for each frequency band component of each corresponding channel. The magnitude/energy measurements are summed by summer 412, which outputs T(F), where T(F) is the total energy of the input signals per frequency band. This value is then divided into each of the channel magnitude/energy values by division units 414 through 422, to generate the corresponding normalized inter-channel level difference (ICLD) signals $M_L(F)$, $M_R(F)$, $M_C(F)$, $M_{LS}(F)$ and $M_{RS}(F)$, where these ICLD signals can be viewed as normalized sub-band energy estimates for each channel.

The 5.1 channel sound is mapped to a normalized position vector as shown with exemplary locations on a 2-dimensional plane comprised of a lateral axis and a depth axis. As shown, the value of the location for $(X_{LS}, Y_{LS})$ is assigned to the origin, the value of $(X_{RS}, Y_{RS})$ is assigned to (0, 1), the value of $(X_L, Y_L)$ is assigned to (0, 1-C), where C is a value between 1 and 0 representative of the setback distance for the left and right speakers from the back of the room. Likewise, the value of $(X_R, Y_R)$ is (1, 1-C). Finally, the value for $(X_C, Y_C)$ is (0.5, 1). These coordinates are exemplary, and can be changed to reflect the actual normalized location or configuration of the speakers relative to each other, such as where the speaker coordinates differ based on the size of the room, the shape of the room or other factors. For example, where 7.1 sound or other suitable sound channel configurations are used, additional coordinate values can be provided that reflect the location of speakers around the room. Likewise, such speaker locations can be customized based on the actual distribution of speakers in an automobile, room, auditorium, arena, or as otherwise suitable.

The estimated image position vector P(F) can be calculated per sub-band as set forth in the following vector equation:

$$P(F)=M_L(F)*(X_L,Y_L)+M_R(F)*(X_R,Y_R)+M_C(F)*(X_C,Y_C)+i\cdot M_{LS}(F)*(X_{LS},Y_{LS})+M_{RS}(F)*(X_{RS},Y_{RS})$$

Thus, for each frequency band, an output of total energy T(F) and a position vector P(F) are provided that are used to define the perceived intensity and position of the apparent frequency source for that frequency band. In this manner, the spatial image of a frequency component can be localized, such as for use with sub-band correction system 110 or for other suitable purposes.

Figure 5:
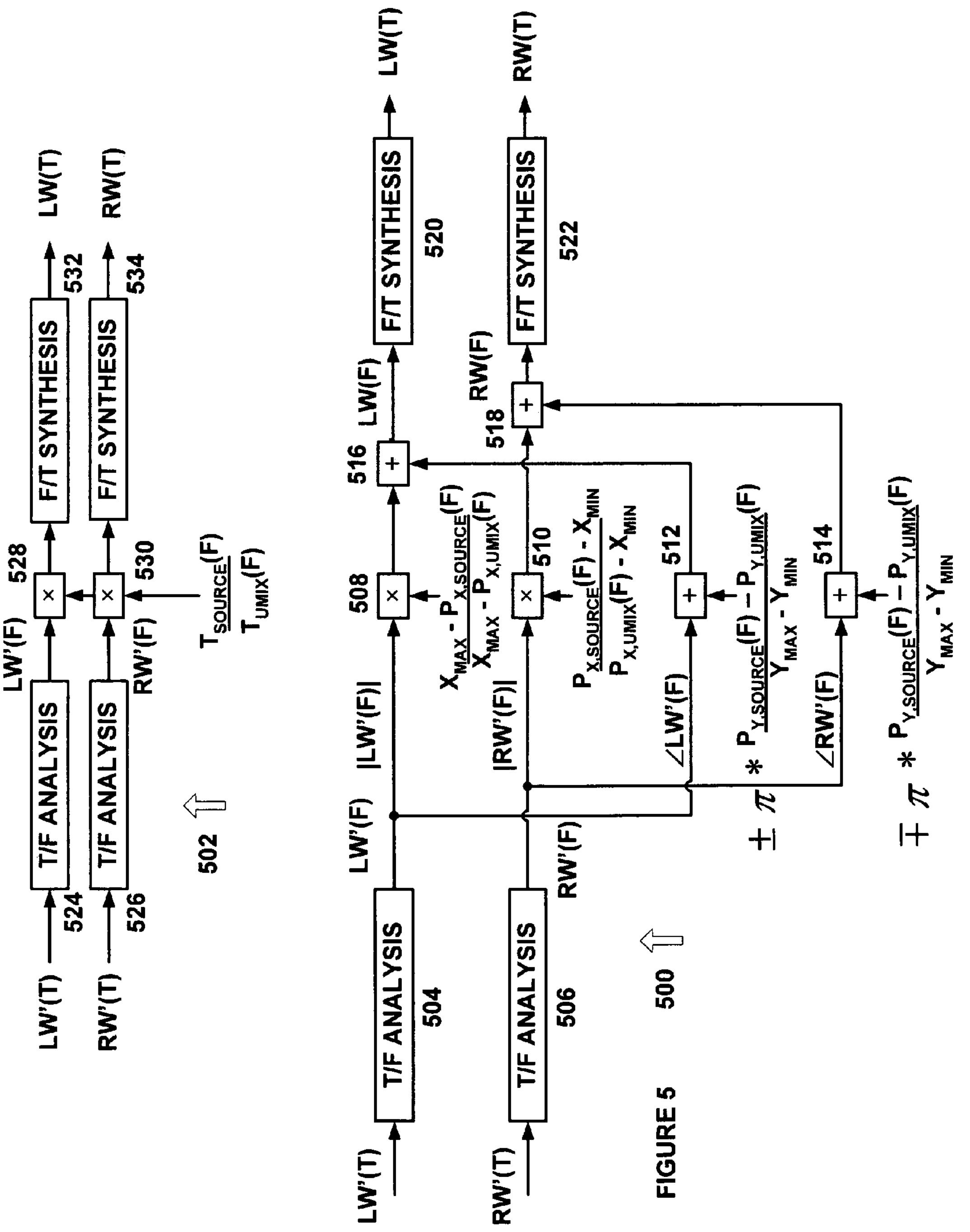
FIG. 5 is a diagram of a sub-band correction system in accordance with an exemplary embodiment of the present invention.

FIG. 5 is a diagram of a sub-band correction system in accordance with an exemplary embodiment of the present invention. The sub-band correction system can be used as sub-band correction system 110 of FIG. 1 or for other suitable purposes. The sub-band correction system receives left watermark LW' (T) and right watermark RW' (T) stereo channel signals and performs energy and image correction on the watermarked signal to compensate for signal inaccuracies for each frequency band that may be created as a result of reference down-mixing or other suitable method. The sub-band correction system receives and utilizes for each sub-band the total energy signals of the source $T_{SOURCE}(F)$ and subsequent up-mixed signal $T_{UMIX}(F)$ and position vectors for the source $P_{SOURCE}(F)$ and subsequent up-mixed signal $P_{UMIX}(F)$, such as those generated by sub-band vector calculation systems 106 and 108 of FIG. 1. These total energy signals and position vectors are used to determine the appropriate corrections and compensations to perform.

The sub-band correction system includes position correction system 500 and spectral energy correction system 502. Position correction system 500 receives time domain signals for left watermark stereo channel LW' (T) and right watermark stereo channel RW'(T), which are converted by time-frequency analysis units 504 and 506, respectively, from the time domain to the frequency domain. These time-frequency analysis units could be an appropriate filter bank, such as a finite impulse response (FIR) filter bank, a quadrature mirror filter (QMF) bank, a discrete Fourier transform (DFT), a time-domain aliasing cancellation (TDAC) filter bank, or other suitable filter bank.

The output of time-frequency analysis units 504 and 506 are frequency domain sub-band signals LW' (F) and RW' (F). Relevant spatial cues of inter-channel level difference (ICLD) and inter-channel coherence (ICC) are modified per sub-band in the signals LW' (F) and RW' (F). For example, these cues could be modified through manipulation of the magnitude or energy of LW' (F) and RW' (F), shown as the absolute value of LW' (F) and RW' (F), and the phase angle of LW' (F) and RW' (F). Correction of the ICLD is performed through multiplication of the magnitude/energy value of LW' (F) by multiplier 508 with the value generated by the following equation:

$$[X_{MAX}-P_{X,SOURCE}(F)]/[X_{MAX}-P_{X,UMIX}(F)]$$

where $X_{MAX}$=maximum X coordinate boundary $P_{X,SOURCE}(F)$=estimated sub-band X position coordinate from source vector $P_{X,UMIX}(F)$=estimated sub-band X position coordinate from subsequent up-mix vector Likewise, the magnitude/energy for RW' (F) is multiplied by multiplier 510 with the value generated by the following equation:

$$[P_{X,SOURCE}(F)-X_{MIN}]/[P_{X,UMIX}(F)-X_{MIN}]$$

where $X_{MIN}$=minimum X coordinate boundary

Correction of the ICC is performed through addition of the phase angle for LW' (F) by adder 512 with the value generated by the following equation:

$$+/-\Pi*[P_{Y,SOURCE}(F)-P_{Y,UMIX}(F)]/[Y_{MAX}-Y_{MIN}]$$

where $P_{Y,SOURCE}(F)$=estimated sub-band Y position coordinate from source vector $P_{Y,UMIX}(F)$=estimated sub-band Y position coordinate from subsequent up-mix vector $Y_{MAX}$=maximum Y coordinate boundary $Y_{MIN}$=minimum Y coordinate boundary Likewise, the phase angle for RW' (F) is added by adder 514 to the value generated by the following equation:

$$-/+\Pi*[P_{Y,SOURCE}(F)-P_{Y,UMIX}(F)]/[Y_{MAX}-Y_{MIN}]$$

Note that the angular components added to LW' (F) and RW' (F) have equal value but opposite polarity, where the resultant polarities are determined by the leading phase angle between LW' (F) and RW' (F).

The corrected LW' (F) magnitude/energy and LW' (F) phase angle are recombined to form the complex value LW(F) for each sub-band by adder 516 and are then converted by frequency-time synthesis unit 520 into a left watermark time domain signal LW(T). Likewise, the corrected RW' (F) magnitude/energy and RW' (F) phase angle are recombined to form the complex value RW(F) for each sub-band by adder 518 and are then converted by frequency-time synthesis unit 522 into a right watermark time domain signal RW(T). The frequency-time synthesis units 520 and 522 can be a suitable synthesis filter bank capable of converting the frequency domain signals back to time domain signals.

As shown in this exemplary embodiment, the inter-channel spatial cues for each spectral component of the watermark left and right channel signals can be corrected using position correction 500 which appropriately modify the ICLD and ICC spatial cues.

Spectral energy correction system 502 can be used to ensure that the total spectral balance of the down-mixed signal is consistent with the total spectral balance of the original 5.1 signal, thus compensating for spectral deviations caused by comb filtering for example. The left watermark time domain signal and right watermark time domain signals LW' (T) and RW' (T) are converted from the time domain to the frequency domain using time-frequency analysis units 524 and 526, respectively. These time-frequency analysis units could be an appropriate filter bank, such as a finite impulse response (FIR) filter bank, a quadrature mirror filter (QMF) bank, a discrete Fourier transform (DFT), a time-domain aliasing cancellation (TDAC) filter bank, or other suitable filter bank. The output from time-frequency analysis units 524 and 526 is LW' (F) and RW' (F) frequency sub-band signals, which are multiplied by multipliers 528 and 530 by $T_{SOURCE}(F)/T_{UMIX}(F)$, where $$T_{SOURCE}(F)=|L(F)|+|R(F)|+|C(F)|+|LS(F)|+|RS(F)|$$

$$T_{UMIX}(F)=|L_{UMIX}(F)|+|R_{UMIX}(F)+|C_{UMIX}(F)|+|LS_{UMIX}(F)|+|RS_{UMIX}(F)|$$

The output from multipliers 528 and 530 are then converted by frequency-time synthesis units 532 and 534 back from the frequency domain to the time domain to generate LW(T) and RW(T). The frequency-time synthesis unit can be a suitable synthesis filter bank capable of converting the frequency domain signals back to time domain signals. In this manner, position and energy correction can be applied to the down-mixed stereo channel signals LW' (T) and RW' (T) so as to create a left and right watermark channel signal LW(T) and RW(T) that is faithful to the original 5.1 signal. LW(T) and RW(T) can be played back in stereo or up-mixed back into 5.1 channel or other suitable numbers of channels without significantly changing the spectral component position or energy of the arbitrary content elements present in the original 5.1 channel sound.

Figure 6:
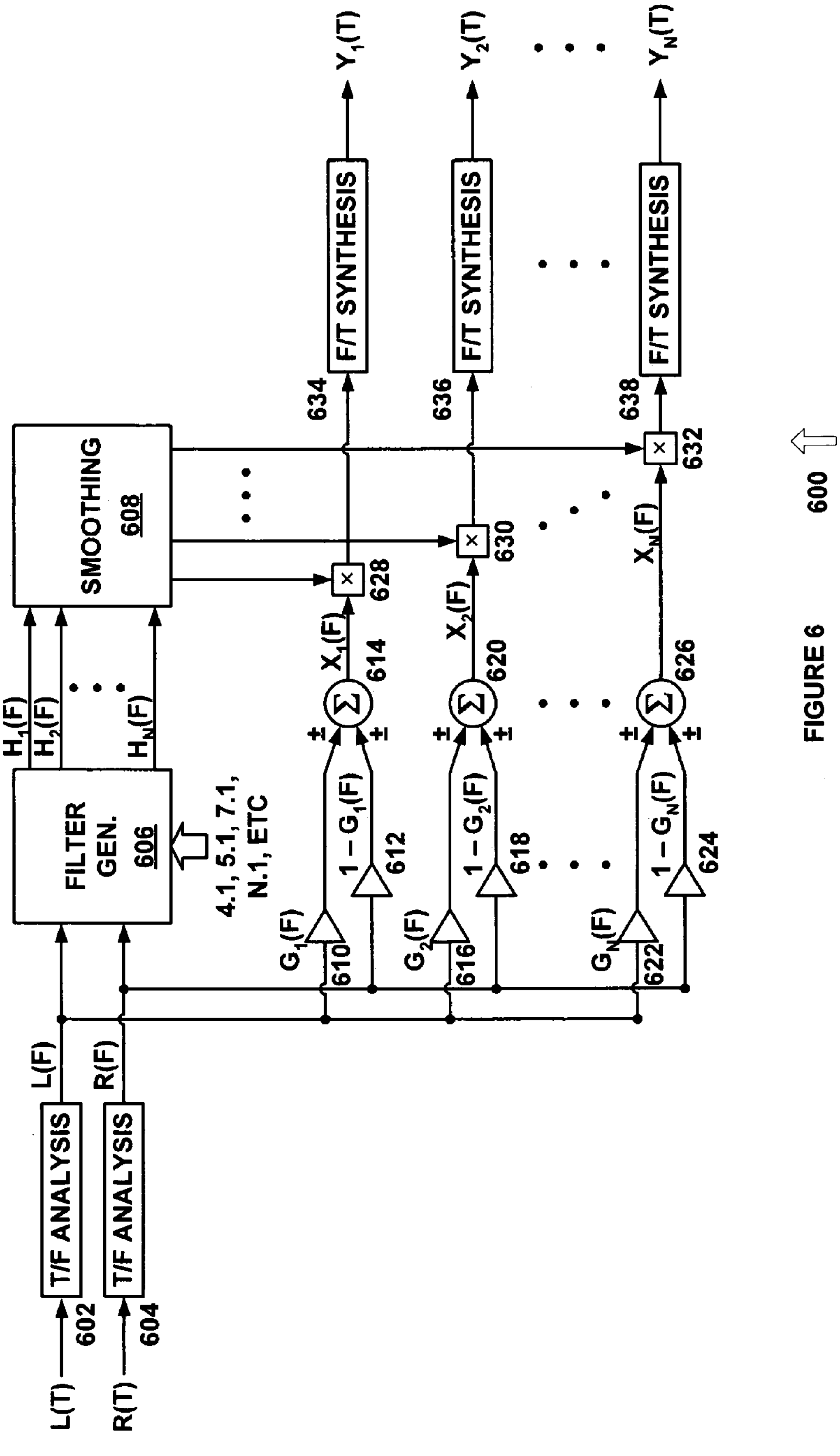
FIG. 6 is a diagram of a system for up-mixing data from M channels to N channels in accordance with an exemplary embodiment of the present invention.

FIG. 6 is a diagram of a system 600 for up-mixing data from M channels to N channels in accordance with an exemplary embodiment of the present invention. System 600 converts stereo time domain data into N channel time domain data.

System 600 includes time-frequency analysis units 602 and 604, filter generation unit 606, smoothing unit 608, and frequency-time synthesis units 634 through 638. System 600 provides improved spatial distinction and stability in an up-mix process through a scalable frequency domain architecture, which allows for high resolution frequency band processing, and through a filter generation method which extracts and analyzes important inter-channel spatial cues per frequency band to derive the spatial placement of a frequency element in the up-mixed N channel signal.

System 600 receives a left channel stereo signal L(T) and a right channel stereo signal R(T) at time-frequency analysis units 602 and 604, which convert the time domain signals into frequency domain signals. These time-frequency analysis units could be an appropriate filter bank, such as a finite impulse response (FIR) filter bank, a quadrature mirror filter (QMF) bank, a discrete Fourier transform (DFT), a time-domain aliasing cancellation (TDAC) filter bank, or other suitable filter bank. The output from time-frequency analysis units 602 and 604 are a set of frequency domain values covering a sufficient frequency range of the human auditory system, such as a 0 to 20 kHz frequency range where the analysis filter bank sub-band bandwidths could be processed to approximate psycho-acoustic critical bands, equivalent rectangular bandwidths, or some other perceptual characterization. Likewise, other suitable numbers of frequency bands and ranges can be used.

The outputs from time-frequency analysis units 602 and 604 are provided to filter generation unit 606. In one exemplary embodiment, filter generation unit 606 can receive an external selection as to the number of channels that should be output for a given environment. For example, 4.1 sound channels where there are two front and two rear speakers can be selected, 5.1 sound systems where there are two front and two rear speakers and one front center speaker can be selected, 7.1 sound systems where there are two front, two side, two rear, and one front center speaker can be selected, or other suitable sound systems can be selected. Filter generation unit 606 extracts and analyzes inter-channel spatial cues such as inter-channel level difference (ICLD) and inter-channel coherence (ICC) on a frequency band basis. Those relevant spatial cues are then used as parameters to generate adaptive channel filters which control the spatial placement of a frequency band element in the up-mixed sound field. The channel filters are smoothed by smoothing unit 608 across both time and frequency to limit filter variability which could cause annoying fluctuation effects if allowed to vary too rapidly. In the exemplary embodiment shown in FIG. 6, the left and right channel L(F) and R(F) frequency domain signals are provided to filter generation unit 606 producing N channel filter signals $H_1(F)$, $H_2(F)$, through $H_N(F)$ which are provided to smoothing unit 608.

Smoothing unit 608 averages frequency domain components for each channel of the N channel filters across both the time and frequency dimensions. Smoothing across time and frequency helps to control rapid fluctuations in the channel filter signals, thus reducing jitter artifacts and instability that can be annoying to a listener. In one exemplary embodiment, time smoothing can be realized through the application of a first-order low-pass filter on each frequency band from the current frame and the corresponding frequency band from the previous frame. This has the effect of reducing the variability of each frequency band from frame to frame. In another exemplary embodiment, spectral smoothing can be performed across groups of frequency bins which are modeled to approximate the critical band spacing of the human auditory system. For example, if an analysis filter bank with uniformly spaced frequency bins is employed, different numbers of frequency bins can be grouped and averaged for different partitions of the frequency spectrum. For example, from zero to five kHz, five frequency bins can be averaged, from 5 kHz to 10 kHz, 7 frequency bins can be averaged, and from 10 kHz to 20 kHz, 9 frequency bins can be averaged, or other suitable numbers of frequency bins and bandwidth ranges can be selected. The smoothed values of $H_1(F)$, $H_2(F)$ through $H_N(F)$ are output from smoothing unit 608.

The source signals $X_1(F)$, $X_2(F)$, through $X_N(F)$ for each of the N output channels are generated as an adaptive combination of the M input channels. In the exemplary embodiment shown in FIG. 6, for a given output channel i, the channel source signal $X_i(F)$ output from summers 614, 620, and 626 are generated as a sum of L(F) multiplied by the adaptive scaling signal $G_i(F)$ and R(F) multiplied by the adaptive scaling signal $1-G_i(F)$. The adaptive scaling signals $G_i(F)$ used by multipliers 610, 612, 616, 618, 622, and 624 are determined by the intended spatial position of the output channel i and a dynamic inter-channel coherence estimate of L(F) and R(F) per frequency band. Likewise, the polarity of the signals provided to summers 614, 620, and 626 are determined by the intended spatial position of the output channel i. For example, adaptive scaling signals $G_i(F)$ and the polarities at summers 614, 620, and 626 can be designed to provide L(F)+R(F) combinations for front center channels, L(F) for left channels, R(F) for right channels, and L(F)−R(F) combinations for rear channels as is common in traditional matrix up-mixing methods. The adaptive scaling signals $G_i(F)$ can further provide a way to dynamically adjust the correlation between output channel pairs, whether they are lateral or depth-wise channel pairs.

The channel source signals $X_1(F)$, $X_2(F)$, through $X_N(F)$ are multiplied by the smoothed channel filters $H_1(F)$, $H_2(F)$, through $H_N(F)$ by multipliers 628 through 632, respectively.

The output from multipliers 628 through 632 is then converted from the frequency domain to the time domain by frequency-time synthesis units 634 through 638 to generate output channels $Y_1(T)$, $Y_2(T)$, through $Y_N(T)$. In this manner, the left and right stereo signals are up-mixed to N channel signals, where inter-channel spatial cues that naturally exist or that are intentionally encoded into the left and right stereo signals, such as by the down-mixing watermark process of FIG. 1 or other suitable process, can be used to control the spatial placement of a frequency element within the N channel sound field produced by system 600. Likewise, other suitable combinations of inputs and outputs can be used, such as stereo to 7.1 sound, 5.1 to 7.1 sound, or other suitable combinations.

Figure 7:
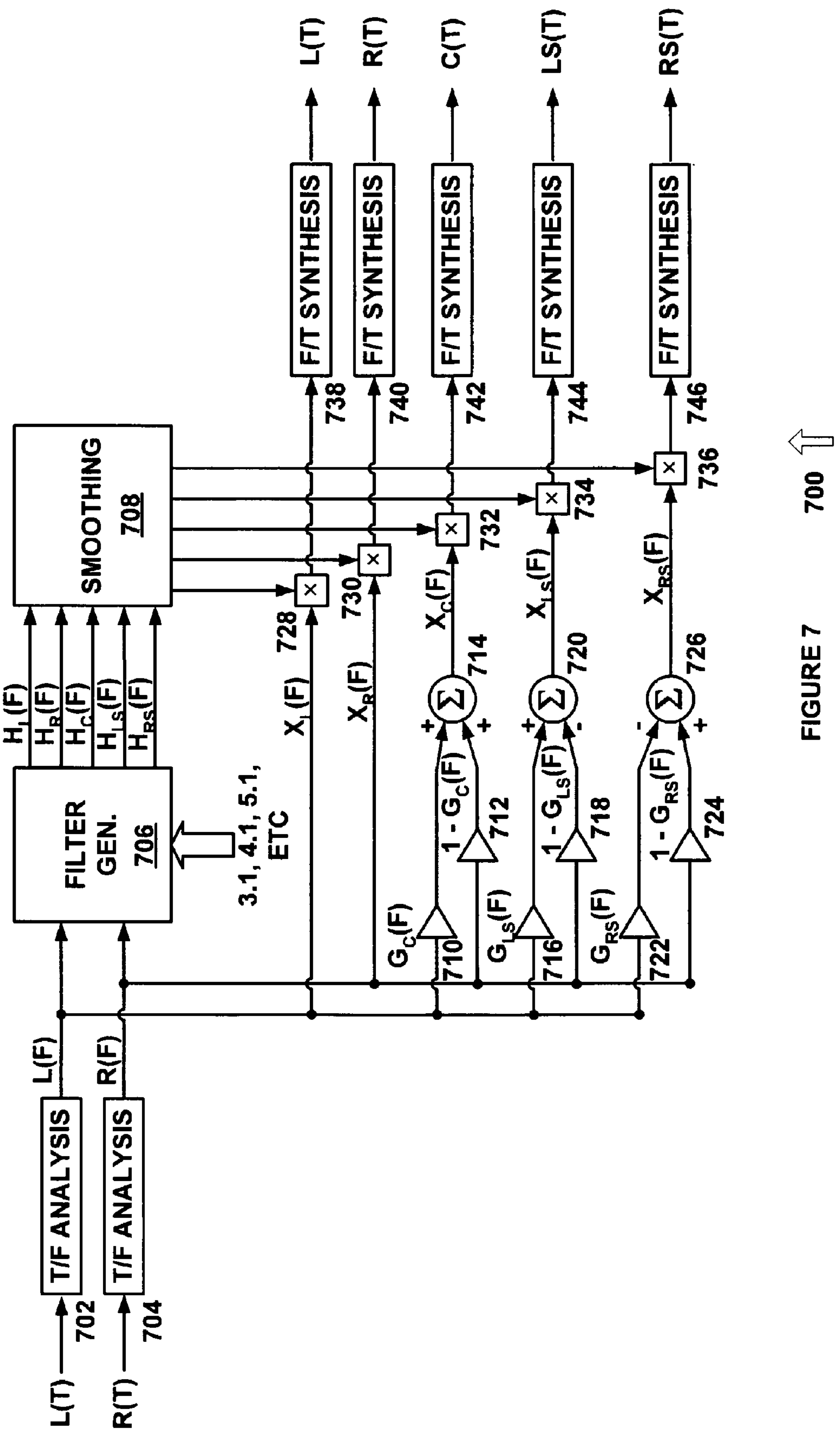
FIG. 7 is a diagram of a system for up-mixing data from 2 channels to 5 channels in accordance with an exemplary embodiment of the present invention.

FIG. 7 is a diagram of a system 700 for up-mixing data from M channels to N channels in accordance with an exemplary embodiment of the present invention. System 700 converts stereo time domain data into 5.1 channel time domain data.

System 700 includes time-frequency analysis units 702 and 704, filter generation unit 706, smoothing unit 708, and frequency-time synthesis units 738 through 746. System 700 provides improved spatial distinction and stability in an up-mix process through the use of a scalable frequency domain architecture which allows for high resolution frequency band processing, and through a filter generation method which extracts and analyzes important inter-channel spatial cues per frequency band to derive the spatial placement of a frequency element in the up-mixed 5.1 channel signal.

System 700 receives a left channel stereo signal L(T) and a right channel stereo signal R(T) at time-frequency analysis units 702 and 704, which convert the time domain signals into frequency domain signals. These time-frequency analysis units could be an appropriate filter bank, such as a finite impulse response (FIR) filter bank, a quadrature mirror filter (QMF) bank, a discrete Fourier transform (DFT), a time-domain aliasing cancellation (TDAC) filter bank, or other suitable filter bank. The output from time-frequency analysis units 702 and 704 are a set of frequency domain values covering a sufficient frequency range of the human auditory system, such as a 0 to 20 kHz frequency range where the analysis filter bank sub-band bandwidths could be processed to approximate psycho-acoustic critical bands, equivalent rectangular bandwidths, or some other perceptual characterization. Likewise, other suitable numbers of frequency bands and ranges can be used.

The outputs from time-frequency analysis units 702 and 704 are provided to filter generation unit 706. In one exemplary embodiment, filter generation unit 706 can receive an external selection as to the number of channels that should be output for a given environment, such as 4.1 sound channels where there are two front and two rear speakers can be selected, 5.1 sound systems where there are two front and two rear speakers and one front center speaker can be selected, 3.1 sound systems where there are two front and one front center speaker can be selected, or other suitable sound systems can be selected. Filter generation unit 706 extracts and analyzes inter-channel spatial cues such as inter-channel level difference (ICLD) and inter-channel coherence (ICC) on a frequency band basis. Those relevant spatial cues are then used as parameters to generate adaptive channel filters which control the spatial placement of a frequency band element in the up-mixed sound field. The channel filters are smoothed by smoothing unit 708 across both time and frequency to limit filter variability which could cause annoying fluctuation effects if allowed to vary too rapidly. In the exemplary embodiment shown in FIG. 7, the left and right channel L(F) and R(F) frequency domain signals are provided to filter generation unit 706 producing 5.1 channel filter signals $H_L(F)$, $H_R(F)$, $H_C(F)$, $H_{LS}(F)$, and $H_{RS}(F)$ which are provided to smoothing unit 708.

Smoothing unit 708 averages frequency domain components for each channel of the 5.1 channel filters across both the time and frequency dimensions. Smoothing across time and frequency helps to control rapid fluctuations in the channel filter signals, thus reducing jitter artifacts and instability that can be annoying to a listener. In one exemplary embodiment, time smoothing can be realized through the application of a first-order low-pass filter on each frequency band from the current frame and the corresponding frequency band from the previous frame. This has the effect of reducing the variability of each frequency band from frame to frame. In one exemplary embodiment, spectral smoothing can be performed across groups of frequency bins which are modeled to approximate the critical band spacing of the human auditory system. For example, if an analysis filter bank with uniformly spaced frequency bins is employed, different numbers of frequency bins can be grouped and averaged for different partitions of the frequency spectrum. In this exemplary embodiment, from zero to five kHz, five frequency bins can be averaged, from 5 kHz to 10 kHz, 7 frequency bins can be averaged, and from 10 kHz to 20 kHz, 9 frequency bins can be averaged, or other suitable numbers of frequency bins and bandwidth ranges can be selected. The smoothed values of $H_L(F)$, $H_R(F)$, $H_C(F)$, $H_{LS}(F)$, and $H_{RS}(F)$ are output from smoothing unit 708.

The source signals $X_L(F)$, $X_R(F)$, $X_C(F)$, $X_{LS}(F)$, and $X_{RS}(F)$ for each of the 5.1 output channels are generated as an adaptive combination of the stereo input channels. In the exemplary embodiment shown in FIG. 7, $X_L(F)$ is provided simply as L(F), implying that $G_L(F)=1$ for all frequency bands. Likewise, $X_R(F)$ is provided simply as R(F), implying that $G_R(F)=0$ for all frequency bands. $X_C(F)$ as output from summer 714 is computed as a sum of the signals L(F) multiplied by the adaptive scaling signal $G_C(F)$ with R(F) multiplied by the adaptive scaling signal $1-G_C(F)$. $X_{LS}(F)$ as output from summer 720 is computed as a sum of the signals L(F) multiplied by the adaptive scaling signal $G_{LS}(F)$ with R(F) multiplied by the adaptive scaling signal $1-G_{LS}(F)$. Likewise, $X_{RS}(F)$ as output from summer 726 is computed as a sum of the signals L(F) multiplied by the adaptive scaling signal $G_{RS}(F)$ with R(F) multiplied by the adaptive scaling signal $1-G_{RS}(F)$. Notice that if $G_C(F)=0.5$, $G_{LS}(F)=0.5$, and $G_{RS}(F)=0.5$ for all frequency bands, then the front center channel is sourced from an L(F)+R(F) combination and the surround channels are sourced from scaled L(F)−R(F) combinations as is common in traditional matrix up-mixing methods. The adaptive scaling signals $G_C(F)$, $G_{LS}(F)$, and $G_{RS}(F)$ can further provide a way to dynamically adjust the correlation between adjacent output channel pairs, whether they are lateral or depth-wise channel pairs. The channel source signals $X_L(F)$, $X_R(F)$, $X_C(F)$, $X_{LS}(F)$, and $X_{RS}(F)$ are multiplied by the smoothed channel filters $H_L(F)$, $H_R(F)$, $H_C(F)$, $H_{LS}(F)$, and $H_{RS}(F)$ by multipliers 728 through 736, respectively.

The output from multipliers 728 through 736 are then converted from the frequency domain to the time domain by frequency-time synthesis units 738 through 746 to generate output channels $Y_L(T)$, $Y_R(T)$, $Y_C(F)$, $Y_{LS}(F)$, and $Y_{RS}(T)$. In this manner, the left and right stereo signals are up-mixed to 5.1 channel signals, where inter-channel spatial cues that naturally exist or are intentionally encoded into the left and right stereo signals, such as by the down-mixing watermark process of FIG. 1 or other suitable process, can be used to control the spatial placement of a frequency element within the 5.1 channel sound field produced by system 700. Likewise, other suitable combinations of inputs and outputs can be used such as stereo to 4.1 sound, 4.1 to 5.1 sound, or other suitable combinations.

Figure 8:
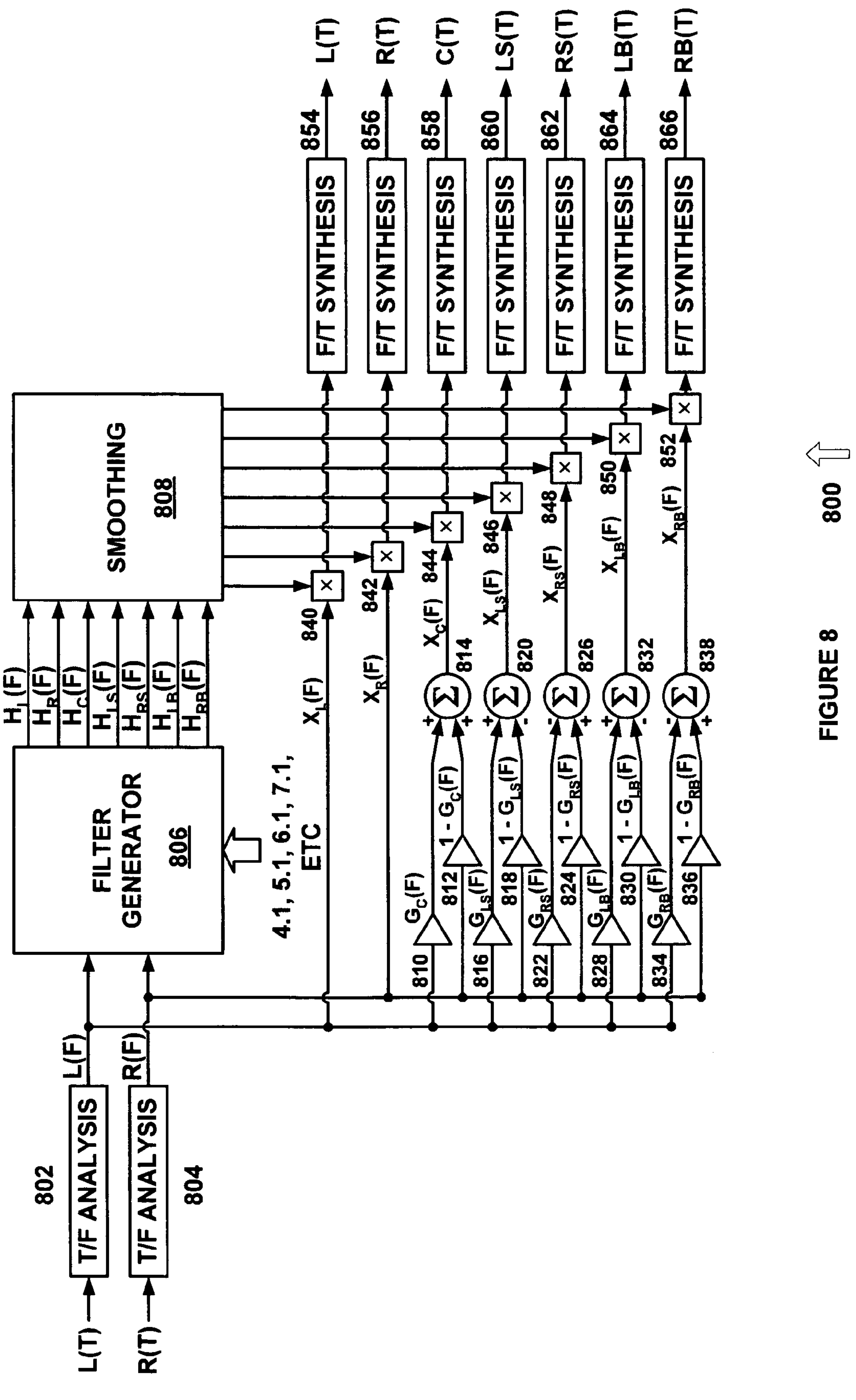
FIG. 8 is a diagram of a system for up-mixing data from 2 channels to 7 channels in accordance with an exemplary embodiment of the present invention.

FIG. 8 is a diagram of a system 800 for up-mixing data from M channels to N channels in accordance with an exemplary embodiment of the present invention. System 800 converts stereo time domain data into 7.1 channel time domain data.

System 800 includes time-frequency analysis units 802 and 804, filter generation unit 806, smoothing unit 808, and frequency-time synthesis units 854 through 866. System 800 provides improved spatial distinction and stability in an up-mix process through a scalable frequency domain architecture, which allows for high resolution frequency band processing, and through a filter generation method which extracts and analyzes important inter-channel spatial cues per frequency band to derive the spatial placement of a frequency element in the up-mixed 7.1 channel signal.

System 800 receives a left channel stereo signal L(T) and a right channel stereo signal R(T) at time-frequency analysis units 802 and 804, which convert the time domain signals into frequency domain signals. These time-frequency analysis units could be an appropriate filter bank, such as a finite impulse response (FIR) filter bank, a quadrature mirror filter (QMF) bank, a discrete Fourier transform (DFT), a time-domain aliasing cancellation (TDAC) filter bank, or other suitable filter bank. The output from time-frequency analysis units 802 and 804 are a set of frequency domain values covering a sufficient frequency range of the human auditory system, such as a 0 to 20 kHz frequency range where the analysis filter bank sub-band bandwidths could be processed to approximate psycho-acoustic critical bands, equivalent rectangular bandwidths, or some other perceptual characterization. Likewise, other suitable numbers of frequency bands and ranges can be used.

The outputs from time-frequency analysis units 802 and 804 are provided to filter generation unit 806. In one exemplary embodiment, filter generation unit 806 can receive an external selection as to the number of channels that should be output for a given environment. For example, 4.1 sound channels where there are two front and two rear speakers can be selected, 5.1 sound systems where there are two front and two rear speakers and one front center speaker can be selected, 7.1 sound systems where there are two front, two side, two back, and one front center speaker can be selected, or other suitable sound systems can be selected. Filter generation unit 806 extracts and analyzes inter-channel spatial cues such as inter-channel level difference (ICLD) and inter-channel coherence (ICC) on a frequency band basis. Those relevant spatial cues are then used as parameters to generate adaptive channel filters which control the spatial placement of a frequency band element in the up-mixed sound field. The channel filters are smoothed by smoothing unit 808 across both time and frequency to limit filter variability which could cause annoying fluctuation effects if allowed to vary too rapidly. In the exemplary embodiment shown in FIG. 8, the left and right channel L(F) and R(F) frequency domain signals are provided to filter generation unit 806 producing 7.1 channel filter signals $H_L(F)$, $H_R(F)$, $H_C(F)$, $H_{LS}(F)$, $H_{RS}(F)$, $H_{LB}(F)$, and $H_{RB}(F)$ which are provided to smoothing unit 808.

Smoothing unit 808 averages frequency domain components for each channel of the 7.1 channel filters across both the time and frequency dimensions. Smoothing across time and frequency helps to control rapid fluctuations in the channel filter signals, thus reducing jitter artifacts and instability that can be annoying to a listener. In one exemplary embodiment, time smoothing can be realized through the application of a first-order low-pass filter on each frequency band from the current frame and the corresponding frequency band from the previous frame. This has the effect of reducing the variability of each frequency band from frame to frame. In one exemplary embodiment, spectral smoothing can be performed across groups of frequency bins which are modeled to approximate the critical band spacing of the human auditory system. For example, if an analysis filter bank with uniformly spaced frequency bins is employed, different numbers of frequency bins can be grouped and averaged for different partitions of the frequency spectrum. In this exemplary embodiment, from zero to five kHz, five frequency bins can be averaged, from 5 kHz to 10 kHz, 7 frequency bins can be averaged, and from 10 kHz to 20 kHz, 9 frequency bins can be averaged, or other suitable numbers of frequency bins and bandwidth ranges can be selected. The smoothed values of $H_L(F)$, $H_R(F)$, $H_C(F)$, $H_{LS}(F)$, $H_{RS}(F)$, $H_{LB}(F)$, and $H_{RB}(F)$ are output from smoothing unit 808.

The source signals $X_L(F)$, $X_R(F)$, $X_C(F)$, $X_{LS}(F)$, $X_{RS}(F)$, $X_{LB}(F)$, and $X_{RB}(F)$ for each of the 7.1 output channels are generated as an adaptive combination of the stereo input channels. In the exemplary embodiment shown in FIG. 8, $X_L(F)$ is provided simply as L(F), implying that $G_L(F)=1$ for all frequency bands. Likewise, $X_R(F)$ is provided simply as R(F), implying that $G_R(F)=0$ for all frequency bands. $X_C(F)$ as output from summer 814 is computed as a sum of the signals L(F) multiplied by the adaptive scaling signal $G_C(F)$ with R(F) multiplied by the adaptive scaling signal $1-G_C(F)$. $X_{LS}(F)$ as output from summer 820 is computed as a sum of the signals L(F) multiplied by the adaptive scaling signal $G_{LS}(F)$ with R(F) multiplied by the adaptive scaling signal $1-G_{LS}(F)$. Likewise, $X_{RS}(F)$ as output from summer 826 is computed as a sum of the signals L(F) multiplied by the adaptive scaling signal $G_{RS}(F)$ with R(F) multiplied by the adaptive scaling signal $1-G_{RS}(F)$. Likewise, $X_{LB}(F)$ as output from summer 832 is computed as a sum of the signals L(F) multiplied by the adaptive scaling signal $G_{LB}(F)$ with R(F) multiplied by the adaptive scaling signal $1-G_{LB}(F)$. Likewise, $X_{RB}$(F) as output from summer 838 is computed as a sum of the signals L(F) multiplied by the adaptive scaling signal $G_{RB}$(F) with R(F) multiplied by the adaptive scaling signal $1-G_{RB}$(F). Notice that if $G_C$(F)=0.5, $G_{LS}$(F)=0.5, $G_{RS}$(F)=0.5, $G_{LB}$(F)=0.5, and $G_{RB}$(F)=0.5 for all frequency bands, then the front center channel is sourced from an L(F)+R(F) combination and the side and back channels are sourced from scaled L(F)−R(F) combinations as is common in traditional matrix up-mixing methods. The adaptive scaling signals $G_C$(F), $G_{LS}$(F), $G_{RS}$(F), $G_{LB}$(F), and $G_{RB}$(F) can further provide a way to dynamically adjust the correlation between adjacent output channel pairs, whether they be lateral or depth-wise channel pairs. The channel source signals $X_L$(F), $X_R$(F), $X_C$(F), $X_{LS}$(F), $X_{RS}$(F), $X_{LB}$(F), and $X_{RB}$(F) are multiplied by the smoothed channel filters $H_L$(F), $H_R$(F), $H_C$(F), $H_{LS}$(F), $H_{RS}$(F), $H_{LB}$(F), and $H_{RB}$(F) by multipliers 840 through 852, respectively.

The output from multipliers 840 through 852 are then converted from the frequency domain to the time domain by frequency-time synthesis units 854 through 866 to generate output channels $Y_L$(T), $Y_R$(T), $Y_C$(F), $Y_{LS}$(F), $Y_{RS}$(T), $Y_{LB}$(T) and $Y_{RB}$(T). In this manner, the left and right stereo signals are up-mixed to 7.1 channel signals, where inter-channel spatial cues that naturally exist or are intentionally encoded into the left and right stereo signals, such as by the down-mixing watermark process of FIG. 1 or other suitable process, can be used to control the spatial placement of a frequency element within the 7.1 channel sound field produced by system 800. Likewise, other suitable combinations of inputs and outputs can be used such as stereo to 5.1 sound, 5.1 to 7.1 sound, or other suitable combinations.

Figure 9:
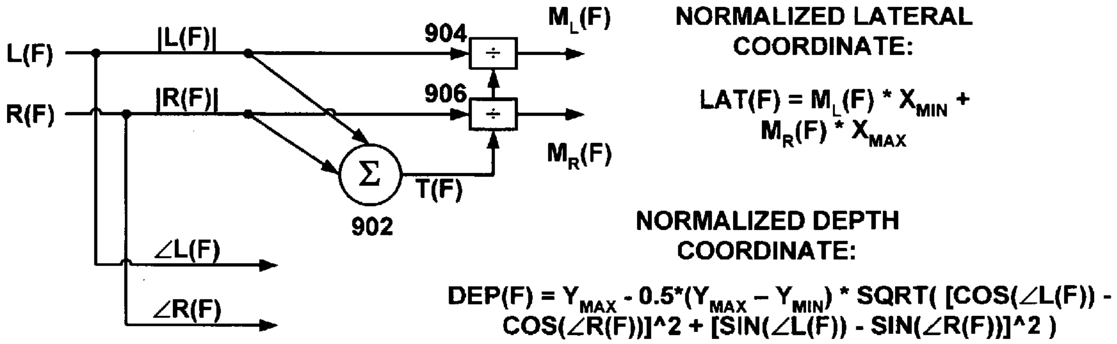
FIG. 9 is a diagram of a method for extracting inter-channel spatial cues and generating a spatial channel filter for frequency domain applications in accordance with an exemplary embodiment of the present invention.

FIG. 9 is a diagram of a system 900 for generating a filter for frequency domain applications in accordance with an exemplary embodiment of the present invention. The filter generation process employs frequency domain analysis and processing of an M channel input signal. Relevant inter-channel spatial cues are extracted for each frequency band of the M channel input signals, and a spatial position vector is generated for each frequency band. This spatial position vector is interpreted as the perceived source location for that frequency band for a listener under ideal listening conditions. Each channel filter is then generated such that the resulting spatial position for that frequency element in the up-mixed N channel output signal is reproduced consistently with the inter-channel cues. Estimates of the inter-channel level differences (ICLD's) and inter-channel coherence (ICC) are used as the inter-channel cues to create the spatial position vector.

In the exemplary embodiment shown in system 900, sub-band magnitude or energy components are used to estimate inter-channel level differences, and sub-band phase angle components are used to estimate inter-channel coherence. The left and right frequency domain inputs L(F) and R(F) are converted into a magnitude or energy component and phase angle component where the magnitude/energy component is provided to summer 902 which computes a total energy signal T(F) which is then used to normalize the magnitude/energy values of the left $M_L$(F) and right channels $M_R$(F) for each frequency band by dividers 904 and 906, respectively. A normalized lateral coordinate signal LAT(F) is then computed from $M_L$(F) and $M_R$(F), where the normalized lateral coordinate for a frequency band is computed as:

$$LAT(F)=M_L(F)*X_{MIN}+M_R(F)*X_{MAX}$$

Likewise, a normalized depth coordinate is computed from the phase angle components of the input as:

$$DEP(F)=Y_{MAX}-0.5*(Y_{MAX}-Y_{MIN})*\mathrm{sqrt}([\mathrm{COS}(\angle L(F))-\mathrm{COS}(\angle R(F))]^{\wedge}2+[\mathrm{SIN}(\angle L(F))-\mathrm{SIN}(\angle R(F))]^{\wedge}2)$$

The normalized depth coordinate is calculated essentially from a scaled and shifted distance measurement between the phase angle components ∠L(F) and ∠R(F). The value of DEP(F) approaches 1 vas the phase angles ∠L(F) and ∠R(F) approach one another on the unit circle, and DEP(F) approaches 0 as the phase angles ∠L(F) and ∠R(F) approach opposite sides of the unit circle. For each frequency band, the normalized lateral coordinate and depth coordinate form a 2-dimensional vector (LAT(F), DEP(F)) which is input into a 2-dimensional channel map, such as those shown in the following FIGS. 10A through 10E, to produce a filter value $H_i$(F) for each channel i. These channel filters $H_i$(F) for each channel i are output from the filter generation unit, such as filter generation unit 606 of FIG. 6, filter generation unit 706 of FIG. 7, and filter generation unit 806 of FIG. 8.

Figure 10A:
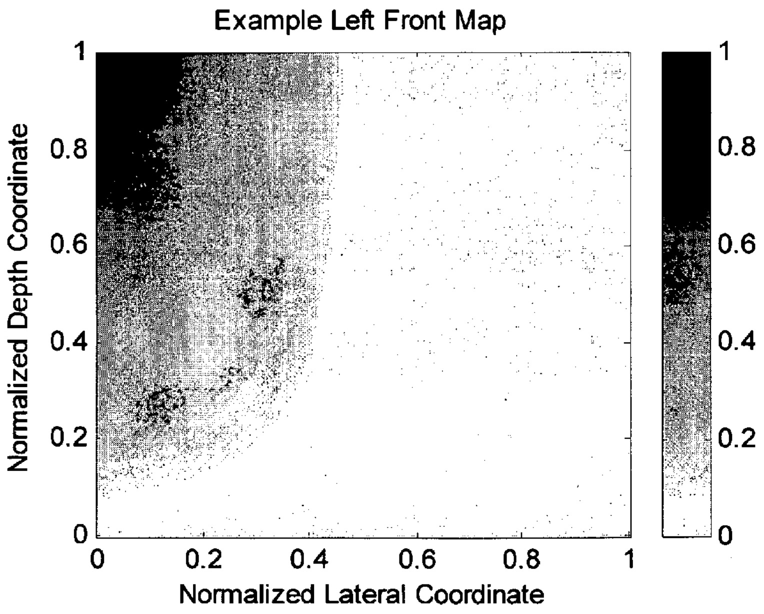
FIG. 10A is a diagram of an exemplary left front channel filter map in accordance with an exemplary embodiment of the present invention.

FIG. 10A is a diagram of a filter map for a left front signal in accordance with an exemplary embodiment of the present invention. In FIG. 10A, filter map 1000 accepts a normalized lateral coordinate ranging from 0 to 1 and a normalized depth coordinate ranging from 0 to 1 and outputs a normalized filter value ranging from 0 to 1. Shades of gray are used to indicate variations in magnitude from a maximum of 1 to a minimum of 0, as shown by the scale on the right-hand side of filter map 1000. For this exemplary left front filter map 1000, normalized lateral and depth coordinates approaching (0, 1) would output the highest filter values approaching 1.0, whereas the coordinates ranging from approximately (0.6, Y) to (1.0, Y), where Y is a number between 0 and 1, would essentially output filter values of 0.

Figure 10B:
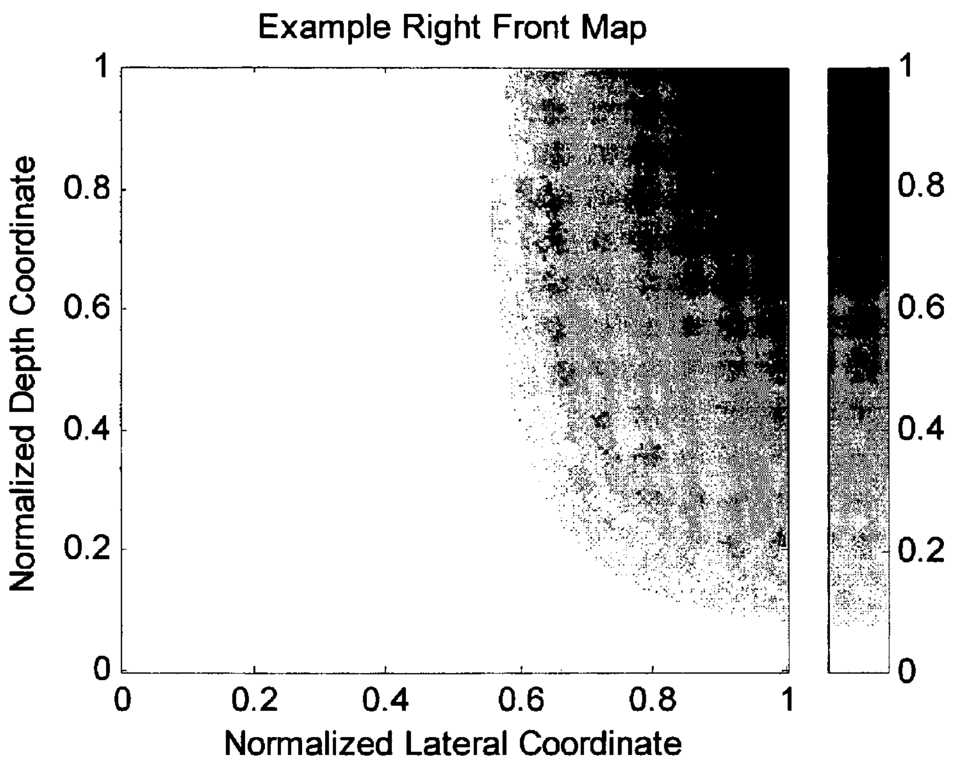
FIG. 10B is a diagram of an exemplary right front channel filter map.

FIG. 10B is a diagram of exemplary right front filter map 1002. Filter map 1002 accepts the same normalized lateral coordinates and normalized depth coordinates as filter map 1000, but the output filter values favor the right front portion of the normalized layout.

Figure 10C:
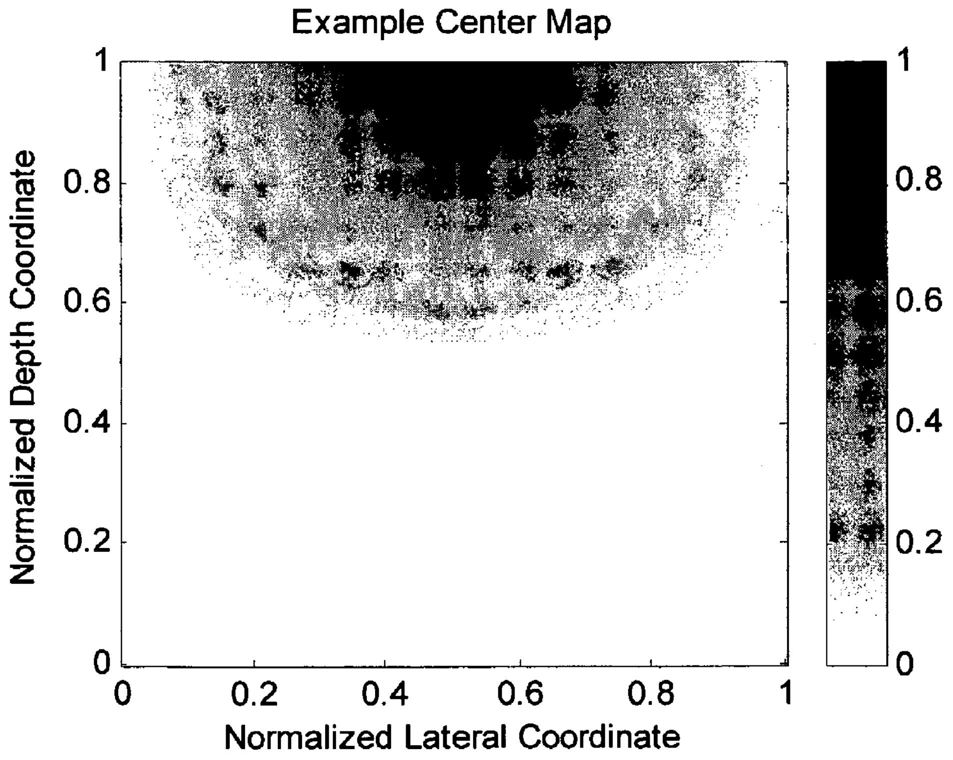
FIG. 10C is a diagram of an exemplary center channel filter map.

FIG. 10C is a diagram of exemplary center filter map 1004. In this exemplary embodiment, the maximum filter value for the center filter map 1004 occurs at the center of the normalized layout, with a significant drop off in magnitude as coordinates move away from the front center of the layout towards the rear of the layout.

Figure 10D:
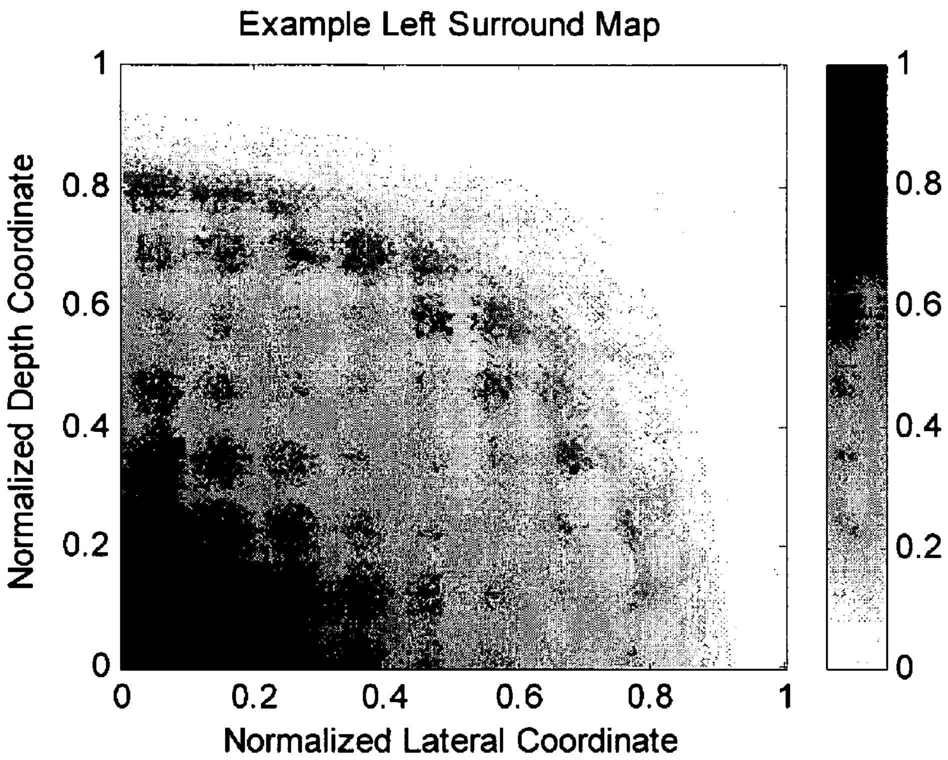
FIG. 10D is a diagram of an exemplary left surround channel filter map.

FIG. 10D is a diagram of exemplary left surround filter map 1006. In this exemplary embodiment, the maximum filter value for the left surround filter map 1006 occurs near the rear left coordinates of the normalized layout and drop in magnitude as coordinates move to the front and right sides of the layout.

Figure 10E:
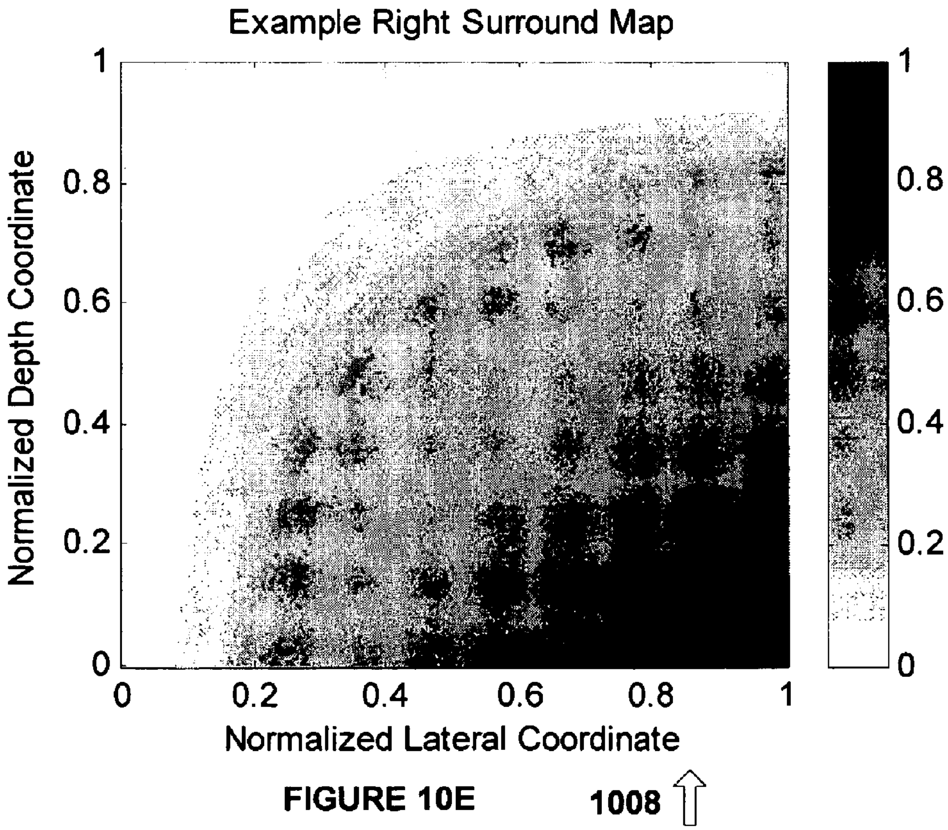
FIG. 10E is a diagram of an exemplary right surround channel filter map.

FIG. 10E is a diagram of exemplary right surround filter map 1008. In this exemplary embodiment, the maximum filter value for the right surround filter map 1008 occurs near the rear right coordinates of the normalized layout and drop in magnitude as coordinates move to the front and left sides of the layout.

Likewise, if other speaker layouts or configurations are used, then existing filter maps can be modified and new filter maps corresponding to new speaker locations can be generated to reflect changes in the new listening environment. In one exemplary embodiment, a 7.1 system would include two additional filter maps with the left surround and right surround being moved upwards in the depth coordinate dimension and with the left back and right back locations having filter maps similar to filter maps 1006 and 1008, respectively.

The rate at which the filter factor drops off can be changed to accommodate different numbers of speakers.

Although exemplary embodiments of a system and method of the present invention have been described in detail herein, those skilled in the art will also recognize that various substitutions and modifications can be made to the systems and methods without departing from the scope and spirit of the appended claims.

What is claimed is:

1. A system for converting between an N channel audio system and an M channel audio system, where M and N are integers and N is greater than M, comprising:

a reference down-mixer receiving one or more of N channels of audio data and converting the one or more N channels of audio data to one or more M channels of audio data;

a reference up-mixer receiving the one or more M channels of audio data and converting the one or more M channels of audio data to one or more N' channels of audio data;

a receiver receiving one or more corrected M channels of audio data and converting the one or more corrected M channels of audio data to one or more N' channels of audio data; and a correction system receiving the one or more M channels of audio data, the one or more N channels of audio data, and the one or more N' channels of audio data and correcting the one or more M channels of audio data based on differences between the one or more N channels of audio data and the one or more N' channels of audio data.

2. The system of claim 1 wherein the correction system further comprises:

a first sub-band vector calculation unit receiving the one or more N channels of audio data and generating one or more first sub-bands of audio spatial image data;

a second sub-band vector calculation unit receiving the one or more N' channels of audio data and generating one or more second sub-bands of audio spatial image data; and the correction system receiving the one or more first sub-bands of audio spatial image data and the one or more second sub-bands of audio spatial image data and correcting the one or more M channels of audio data based on differences between the one or more first sub-bands of audio spatial image data and the one or more second sub-bands of audio spatial image data.

3. The system of claim 2 wherein each of the one or more first sub-bands of audio spatial image data and the one or more second sub-bands of audio spatial image data has an associated energy value and position value.

4. The system of claim 3 wherein each of the position values represents the apparent location of the associated sub-band of audio spatial image data in two-dimensional space, where a coordinate of the location is determined by a vector sum of an energy value associated with one or more of N sound sources and a coordinate of one or more of the N sound sources.

5. The system of claim 1 wherein the reference down-mixer further comprises one or more phase shift stages, each receiving one of the N channels of audio data and applying a predetermined phase shift to the associated channel of audio data.

6. The system of claim 5 wherein the reference down-mixer further comprises one or more summation stages coupled to one or more of the phase shift stages and combining the output from the one or more phase shift stages in a predetermined manner.

7. The system of claim 1 wherein the reference up-mixer further comprises:

a time domain to frequency domain conversion stage receiving one or more of the M channels of audio data and generating one or more sub-bands of audio spatial image data;

a filter generator receiving one or more of the M channels of the one or more sub-bands of audio spatial image data and generating two or more filters;

a smoothing stage receiving the two or more filters and averaging two or more of the filters.

8. A system for converting between an N channel audio system and an M channel audio system, where M and N are integers and N is greater than M, comprising:

a reference down-mixer receiving one or more of N channels of audio data and converting the one or more N channels of audio data to one or more M channels of audio data;

a correction system receiving the one or more M channels of audio data, the one or more N channels of audio data, and one or more N' channels of audio data and correcting the one or more M channels of audio data based on differences between the one or more N channels of audio data and the one or more N' channels of audio data; and a receiver receiving the corrected one or more M channels of audio data and generating one or more N" channels of audio data.

9. The system of claim 8 further comprising a reference up-mixer receiving the one or more M channels of audio data and converting the one or more M channels of audio data to the one or more N' channels of audio data.

10. The system of claim 8 wherein the correction system further comprises:

a first sub-band vector calculation unit receiving the one or more N channels of audio data and generating one or more first sub-bands of audio spatial image data;

a second sub-band vector calculation unit receiving the one or more N' channels of audio data and generating one or more second sub-bands of audio spatial image data; and the correction system receiving the one or more first sub-bands of audio spatial image data and the one or more second sub-bands of audio spatial image data and correcting the one or more M channels of audio data based on differences between the one or more first sub-bands of audio spatial image data and the one or more second sub-bands of audio spatial image data.

11. The system of claim 10 wherein each of the one or more first sub-bands of audio spatial image data and the one or more second sub-bands of audio spatial image data has an associated energy value and position value.

12. The system of claim 11 wherein each of the position values represents the apparent location of the associated sub-band of audio spatial image data in two-dimensional space, where a coordinate of the location is determined by a vector sum of an energy value associated with one or more of N sound sources and a coordinate of one or more of the N sound sources.

13. The system of claim 8 wherein the reference down-mixer further comprises one or more phase shift stages, each receiving one of the N channels of audio data and applying a predetermined phase shift to the associated channel of audio data.

14. The system of claim 13 wherein the reference down-mixer further comprises one or more summation stages coupled to one or more of the phase shift stages and combining the output from the one or more phase shift stages in a predetermined manner.

15. The system of claim 9 wherein the reference up-mixer further comprises:

a time domain to frequency domain conversion stage receiving one or more of the M channels of audio data and generating one or more sub-bands of audio spatial image data;

a filter generator receiving one or more of the M channels of the one or more sub-bands of audio spatial image data and generating two or more filters;

a smoothing stage receiving the one or more filters and averaging two or more of the filters.

16. A method for converting between an N channel audio system and an M channel audio system, where N and M are integers and N is greater than M, comprising:

converting one or more of N channels of audio data to one or more of M channels of audio data using an audio data processing system;

correcting the one or more M channels of audio data based on differences between one or more of the N channels of audio data and one or more N' channels of audio data using an audio data processing system; and receiving the corrected M channels of audio data and converting the corrected M channels of audio data into N" channels of audio data.

17. The method of claim 16 further comprising converting one or more of the M channels of audio data to one or more of the N' channels of audio data.

18. The method of claim 16 wherein converting one or more of the N channels of audio data to one or more of the M channels of audio data comprises processing one or more of the N channels of audio data with a phase shift function to apply a predetermined phase shift to the associated channel of audio data.

19. The method of claim 17 wherein converting one or more of the M channels of audio data to one or more of the N' channels of audio data comprises:

converting one or more of the M channels of audio data from a time domain to one or more sub-bands in frequency domain;

generating one or more filters using the one or more of the sub-bands of the M channels; and averaging two or more of the filters.

20. The method of claim 16 wherein correcting one or more of the M channels of audio data based on differences between one or more of the N channels of audio data and one or more of the N' channels of audio data comprises determining an energy and position vector for each of one or more sub-bands of one or more of the N channels of audio data.

21. The method of claim 16 wherein correcting one or more sub-bands of the M channels of audio data comprises adjusting an energy and a position vector for one or more of the sub-bands of one or more of the M channels of audio data such that the adjusted sub-bands of one or more of the M channels of audio data are converted into one or more N" channels of audio data having one or more sub-band energy and position vectors that are closer to the energy and the position vectors of one or more of the sub-bands of one or more of the N channels of audio data than a corresponding energy and position vector for one or more of the sub-bands of one or more of the N' channels of audio data.

* * * * *